(12) United States Patent
Ronte

(10) Patent No.: US 10,798,668 B2
(45) Date of Patent: Oct. 6, 2020

(54) SYNCHRONIZATION CIRCUIT, SYNCHRONIZATION METHOD, SIGNAL GENERATING DEVICE, SIGNAL GENERATING METHOD, AND RECORDING MEDIUM

(71) Applicant: Sunao Ronte, Atsugi (JP)

(72) Inventor: Sunao Ronte, Atsugi (JP)

(73) Assignee: ANRITSU CORPORATION, Atsugi-shi (JP)

( * ) Notice: Subject to any disclaimer, the term of this patent is extended or adjusted under 35 U.S.C. 154(b) by 247 days.

(21) Appl. No.: 15/471,122

(22) Filed: Mar. 28, 2017

(65) Prior Publication Data

US 2017/0280407 A1 Sep. 28, 2017

(30) Foreign Application Priority Data

Mar. 28, 2016 (JP) .................................. 2016-064717
Mar. 30, 2016 (JP) .................................. 2016-069299

(51) Int. Cl.
*H04W 56/00* (2009.01)
*H04L 27/26* (2006.01)
*H04L 25/03* (2006.01)

(52) U.S. Cl.
CPC ..... *H04W 56/0035* (2013.01); *H04L 27/2601* (2013.01); *H04L 27/2634* (2013.01);
(Continued)

(58) Field of Classification Search
CPC ......... H04L 25/03343; H04L 25/03834; H04L 27/2601; H04L 27/2634; H04L 27/2657; H04L 27/2662; H04W 56/0035
(Continued)

(56) References Cited

U.S. PATENT DOCUMENTS

2015/0029962 A1* 1/2015 Yun ...................... H04L 27/2692
370/329
2016/0219312 A1* 7/2016 Mun .................... H04N 21/2383
(Continued)

FOREIGN PATENT DOCUMENTS

JP 10022973 A 1/1998
JP 2008042898 A 2/2008
(Continued)

OTHER PUBLICATIONS

Phydyas: NPL: Phydyas, date Jun. 2010, by: M. Bellanger on behalf of the participants: CNAM: M. Bellanger, D.LeRuyet, D.Roviras, M. Terre TUM: J.Nossek, L.Baltar, Q.Bai, D.Waldhauser TUT: M. Renfors, T.Ihalainen, A.Viholainen, TH.Stitz UCL: (Year: 2010).*

(Continued)

*Primary Examiner* — Huy D Vu
*Assistant Examiner* — Nizam U Ahmed
(74) *Attorney, Agent, or Firm* — Greer Burns & Crain Ltd.

(57) ABSTRACT

According to one embodiment, a synchronization circuit includes a received-signal detecting unit which detects a received signal including a first and a second reference signal, a timing-synchronization adjusting unit including a storage module storing information of the first reference signal and a correlation operating module carrying out correlation operation of the first reference signal included in the received signal and the information of the first reference signal output from the storage module, the timing-synchronization adjusting unit which carries out timing synchronization so that a result of the correlation operation carried out by the correlation operating module becomes a predetermined value, and a phase-synchronization adjusting unit which carries out phase synchronization of a subcarrier by adjusting a component varied depending on a phase of a (Continued)

subcarrier frequency by using a phase modulation signal included in the second reference signal, wherein the received signal is a filtered multicarrier signal.

8 Claims, 15 Drawing Sheets

(52) U.S. Cl.
CPC ...... *H04L 27/2657* (2013.01); *H04L 27/2662* (2013.01); *H04L 25/03343* (2013.01); *H04L 25/03834* (2013.01)

(58) Field of Classification Search
USPC .......................................................... 370/350
See application file for complete search history.

(56) References Cited

U.S. PATENT DOCUMENTS

| 2017/0131425 | A1* | 5/2017 | Olsson | G01V 3/081 |
| 2017/0171010 | A1* | 6/2017 | Qu | H04L 27/34 |

FOREIGN PATENT DOCUMENTS

| JP | 2012191297 A | 10/2012 |
| JP | 2016506125 A | 2/2016 |
| WO | 2015024994 A1 | 2/2015 |

OTHER PUBLICATIONS

Bellanger et al.; "FBMC physical layer: a primer"; PHYDYAS pp. 1-31; Jun. 2010.
Michailow et al.; "Generalized Frequency Division Multiplexing for 5th Generation Cellular Networks"; IEEE Trans. on Communications; vol. 62, No. 9, pp. 3045-3061; Aug. 5, 2014.
Schaich et al.; "Waveform contenders for 5G—suitability for short packet and low latency transmissions"; 2014 IEEE 79th Vehicular Technology Conference (VTC Spring); May 18-21, 2014.
Wunder et al.; "5GNOW: Non-orthogonal, Asynchronous Waveforms for Future Mobile Applications"; IEEE Communications Magazine, vol. 52, No. 2, pp. 97-105; Feb. 19, 2014.
Alcatel-Lucent; Alcatel-Lucent Shanghai Bell, "5G Views and Standardization" , 3GPP workshop 2015-09-17_18_RAN_5G RWS-150016, Sep. 2015, pp. 1-14, downloaded by the JPO from: http://www.3gpp.org/ftp/workshop/2015-09-17_18_RAN_5G/Docs/RWS-150016.zip.
Keysight Technologies; "N7608B Custom Modulation/5G Signal Studio—89600B Custom OFDM/IQ Analysis Option" , 2015, 2 pages.
Rohde & Schwarz; "R&S®FS-K196—5G interference candidates" , 2015, 2 pages.
Office Action issued in JP Application No. 2016-064717, dated Aug. 22, 2017, 4 pages (machine translation provided by Global Dossier).
Office Action issued in JP Application No. 2016-069299, dated Jun. 26, 2018, 4 pages (machine translation provided by Global Dossier).

* cited by examiner

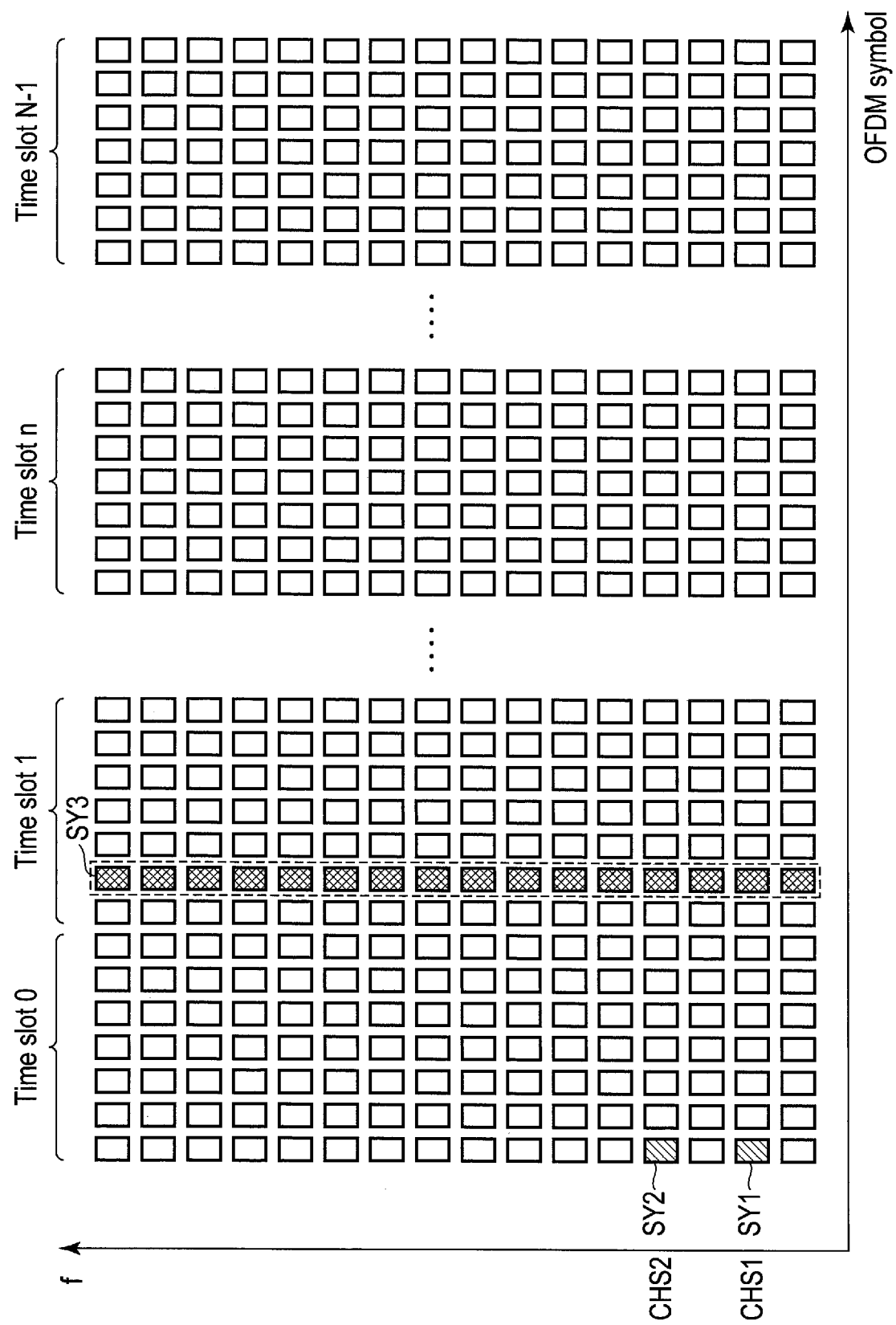
F I G. 2

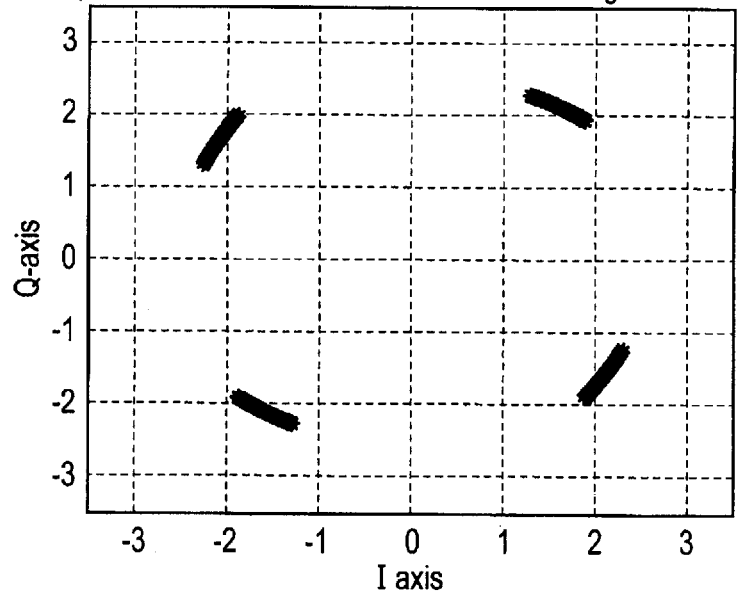
F I G. 7
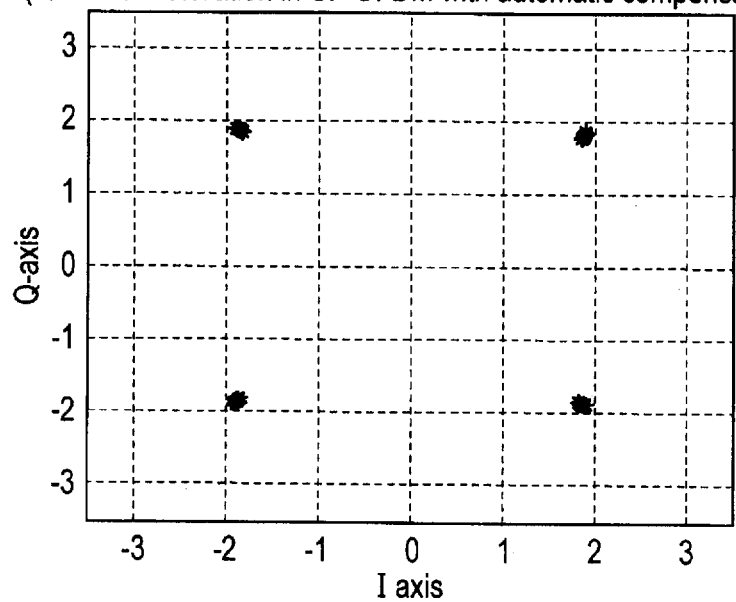
F I G. 8

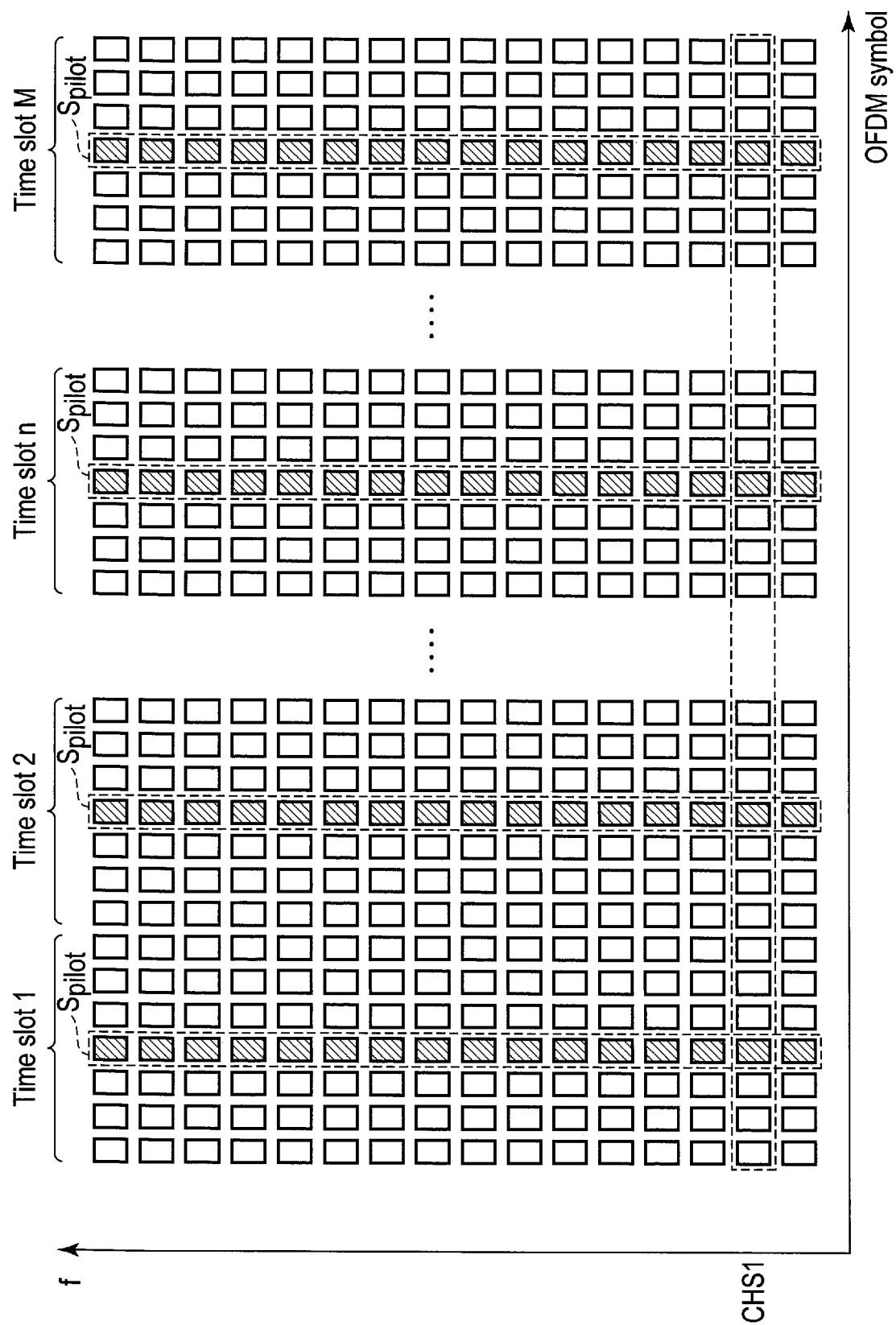
F I G. 10

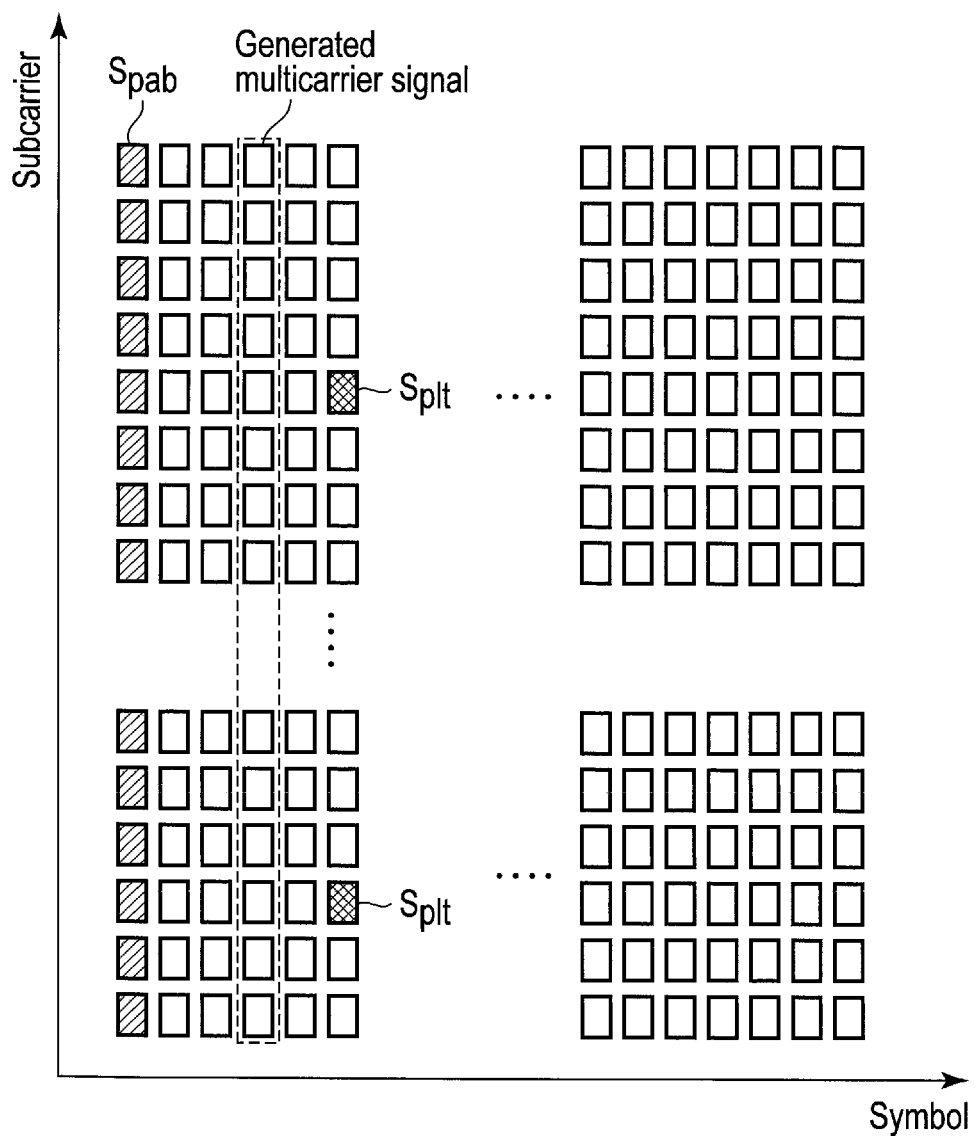
F I G. 16 bij in a case in which the modulation scheme is 16QAM

| Pij | 00 | 01 | 11 | 10 |
|---|---|---|---|---|
| 00 | (-3,+3) | (-3,+1) | (-3,-1) | (-3,-3) |
| 01 | (-1,+3) | (+1,-1) | (-1,-1) | (-1,-3) |
| 11 | (+1,+3) | (+1,+1) | (+1,-1) | (+1,-3) |
| 10 | (+3,+3) | (+3,+1) | (+3,-1) | (+3,-3) |

SYNCHRONIZATION CIRCUIT, SYNCHRONIZATION METHOD, SIGNAL GENERATING DEVICE, SIGNAL GENERATING METHOD, AND RECORDING MEDIUM

CROSS-REFERENCE TO RELATED APPLICATIONS

This application is based upon and claims the benefit of priority from prior Japanese Patent Applications No. 2016-064717, filed Mar. 28, 2016; and No. 2016-069299, filed Mar. 30, 2016, the entire contents of all of which are incorporated herein by reference.

BACKGROUND OF THE INVENTION

1. Field of the Invention

Embodiments described herein relate generally to synchronization circuits, synchronization methods, signal generating devices, signal generating methods, and recording media.

2. Description of the Related Art

An OFDM (Orthogonal Frequency-Division Multiplexing) scheme is a modulation scheme having good transmission efficiency in terms of time frequencies. However, under the circumstances in which frequency resources are depleted along with increase of wireless terminals, it is desired to further improve usage efficiency of frequency bands. When out-of-band (Out of Band) characteristics of OFDM signals, which are a multicarrier signal scheme, are improved, the channels in the part outside bands can be further effectively utilized. Therefore, in next-generation mobile communication systems, research and development of the filtered multicarrier scheme is underway (for example, see below described Non-Patent Documents 1 to 4).

The filtered multicarrier scheme is a scheme in which filter processing is added to subcarriers of multicarrier signals such as OFDM signals (for example, see Non-Patent Document 1). In an OFDM signal, which is a typical multicarrier signal, a CP (Cyclic Prefix) signal is prepared as a guard interval, and part of the signal is copied and disposed in a front part of a main signal and subjected to transmission. When correlation operation of the CP signal and the main signal is carried out, the position information of the signal arrangement can be elucidated from the maximum value of this correlation; in other words, it takes a role as a synchronization signal, while this is a redundant signal in terms of signal transmission efficiency. However, in the filtered multicarrier scheme, the part of the guard interval corresponding to CP is extended by transient responses caused by filtering; therefore, normally, the guard interval like CP is not specified. Therefore, in an environment to evaluate the signals of the filtered multicarrier scheme generated in a signal transmitting device, a new reception synchronization signal for carrying out synchronization is required. On the other hand, in order to effectively utilize channels, it is preferred to reduce the added synchronization signal as much as possible.

An object of the invention is to provide a transmitter, a receiver including a synchronous circuit or a transmitter-receiver system, which is applicable in an environment of evaluating signals of filtered multicarrier communications regardless of the presence/absence of CP.

OFDM signals whose subcarriers are subjected to filter processing will be referred to as filtered multicarrier signals, hereinafter.

(Non-Patent Document 1) 5GNOW: Non-Orthogonal, Asynchronous Waveforms for Future Mobile Applications, IEEE Communications Magazine, February 2014

(Non-Patent Document 2) M. Bellanger et al., "FBMC physical layer: a primer", 2010

(Non-Patent Document 3) Frank Schaich et al., "Waveform contenders for 5G—suitability for short packet and low latency transmissions", Vehicular Technology Conference, 2014 IEEE 79th (Non-Patent Document 4) Nicola Michailow et al. "Generalized Frequency Division Multiplexing for 5th Generation Cellular Networks", IEEE Transactions on Communications, Vol. 62, No. 9, 2014

BRIEF SUMMARY OF THE INVENTION

According to a first aspect of the present invention, there is provided a synchronization circuit including:
a received-signal detecting unit configured to detect a received signal including a first reference signal and a second reference signal;
a timing-synchronization adjusting unit including
a storage module configured to store information of the first reference signal and
a correlation operating module configured to carry out correlation operation of the first reference signal included in the received signal and the information of the first reference signal output from the storage module,
the timing-synchronization adjusting unit configured to carry out timing synchronization so that a result of the correlation operation carried out by the correlation operating module becomes a predetermined value; and
a phase-synchronization adjusting unit configured to carry out phase synchronization of a subcarrier by adjusting a component varied depending on a phase of a subcarrier frequency using a phase modulation signal included in the second reference signal; wherein
the received signal is a filtered multicarrier signal.

According to a second aspect of the present invention, there is provided a synchronization method including:
a received-signal detecting step of detecting a received signal including a first reference signal and a second reference signal;
a timing-synchronization adjusting step including
a storage processing of storing information of the first reference signal and
a correlation processing of carrying out correlation operation of the first reference signal included in the received signal and the information of the first reference signal output through the storage processing,
the timing-synchronization adjusting step of carrying out timing synchronization so that a result of the correlation processing becomes a predetermined value; and
a phase-synchronization adjusting step of carrying out phase synchronization of a subcarrier by adjusting a component varied depending on a phase of a subcarrier frequency using a phase modulation signal included in the second reference signal; wherein
the received signal is a filtered multicarrier signal.

According to a third aspect of the present invention, there is provided a signal generating device including:
a scenario forming module configured to acquire a signal type of a multicarrier signal and a number of a subcarrier and set a signal generation operator and an order of operation required for generating the multicarrier signal of the signal type; and an executing module configured to acquire a number of input signal corresponding to the number of the subcarrier and carry out operation of the signal generation operator in accordance with the order, thereby generating the multicarrier signal from the input signal.

According to a fourth aspect of the present invention, there is provided a signal generating method of a signal generating device including:

a designing step of acquiring a signal type of a multicarrier signal and a number of a subcarrier and setting a signal generation operator and an order of operation required for generating the multicarrier signal of the signal type; and an executing step of acquiring a number of input signal corresponding to the number of the subcarrier and carrying out operation of the signal generation operator in accordance with the order, thereby generating the multicarrier signal from the input signal.

According to a fifth aspect of the present invention, there is provided a computer-readable recording medium recording a program executed by a signal generating device, the program having:

a designing step of acquiring a signal type of a multicarrier signal and a number of a subcarrier and setting a signal generation operator and an order of operation required for generating the multicarrier signal of the signal type; and an executing step of acquiring a number of input signal corresponding to the number of the subcarrier and carrying out operation of the signal generation operator in accordance with the order, thereby generating the multicarrier signal from the input signal.

BRIEF DESCRIPTION OF THE SEVERAL VIEWS OF THE DRAWING

A general architecture that implements the various feature of the invention will now be described with reference to the drawings. The drawings and the associated descriptions are provided to illustrate embodiments of the invention and not to limit the scope of the invention.

FIG. 2 is an exemplary diagram showing an arrangement example of reference signals according to a first embodiment;

FIG. 7 is an exemplary diagram showing an example of a constellation map of a third symbol before STO and CFO adjustment in the first embodiment;

FIG. 8 is an exemplary diagram showing an example of a constellation map of the third symbol after the STO and CFO adjustment in the first embodiment;

FIG. 10 is an exemplary diagram showing an arrangement example of pilot signals according to the second embodiment;

FIG. 16 is an exemplary diagram showing an example of a multicarrier signal;

DETAILED DESCRIPTION OF THE INVENTION

Various embodiments will be described hereinafter with reference to the accompanying drawings.

Hereinafter, embodiments of the present invention will be described in detail with reference to drawings. Note that the present invention is not limited to the embodiments shown below. These embodiments are merely examples, and the present invention can be carried out in variously changed/improved modes based on the knowledge of those skilled in the art. Note that the constituent elements with the same reference signs in the present specification and drawings represent mutually the same ones.

Hereinafter, the embodiments of synchronization processing techniques according to synchronization circuits and synchronization methods of the present invention will be described in first to third embodiments.

Moreover, the embodiments of signal generating techniques according to signal generating circuits and signal generating methods of the present invention are described in fourth to seventh embodiments.

First Embodiment: Synchronization Processing Techniques

Figure 1:
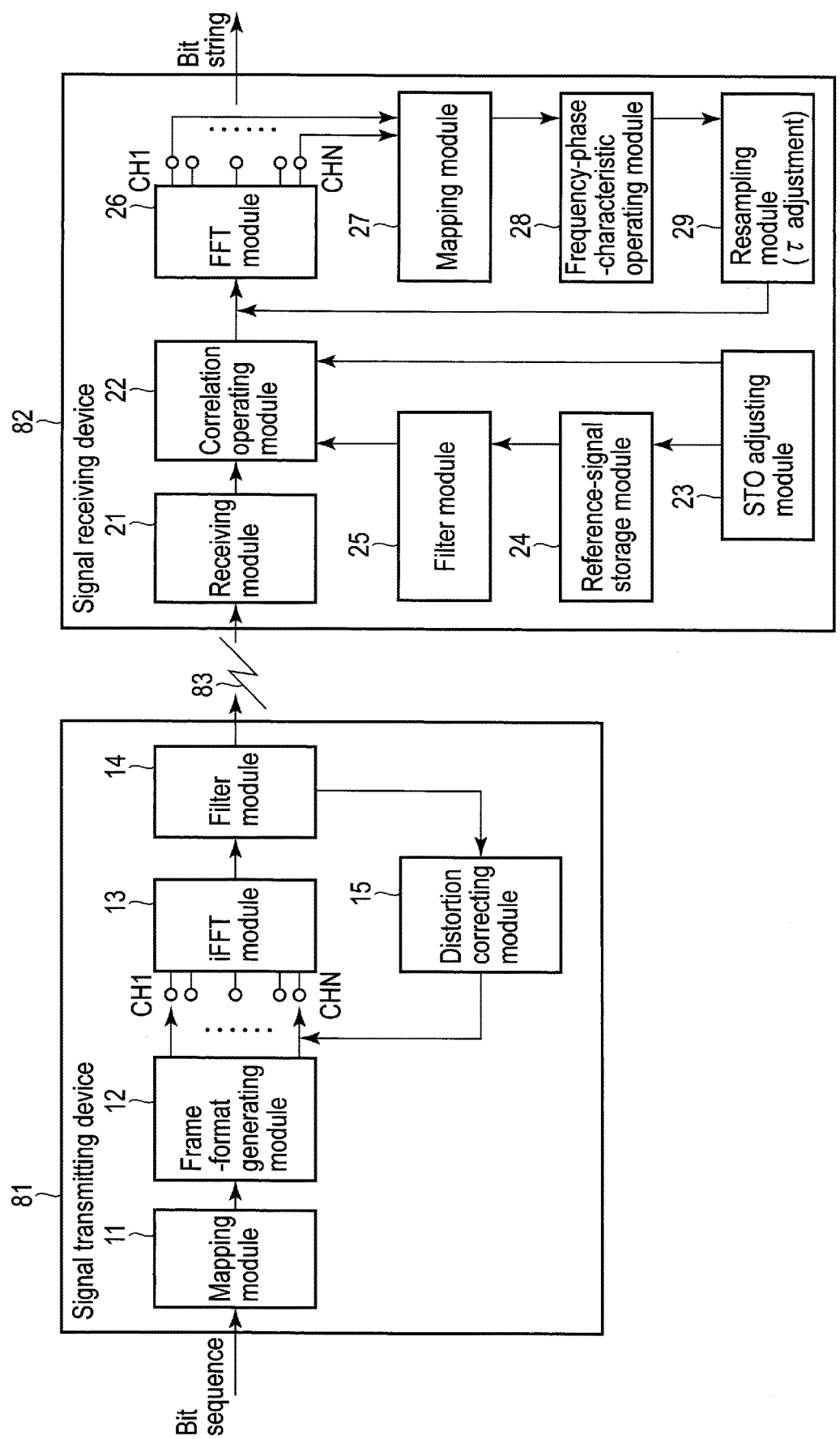
FIG. 1 is an exemplary diagram showing an example of a system configuration according to an embodiment.

FIG. 1 shows an example of a system configuration according to the present embodiment. A communication system according to the embodiment is provided with a signal transmitting device (SG: Signal Generator) 81 and a signal receiving device (SA: Signal Analyzer) 82. The signal transmitting device 81 transmits filtered multicarrier signals (including OFDM signals), which are baseband signals modulated by desired carrier frequencies. A test medium (EUT: Equipment Under Test) 83 propagates the filtered multicarrier signals (including OFDM signals). The signal receiving device 82 receives the filtered multicarrier signals, demodulates them to baseband signals, and carries out data capturing of the baseband signals. In the data capturing, the signal receiving device 82 retrieves them as digital signals.

In the present embodiment, an arbitrary scheme which forms filtered multicarrier signals can be used.

Examples of such a scheme include: FBMC (for example, see Non-Patent Document 2), UF-OFDM (for example, see Non-Patent Document 3), and GFDM (for example, see Non-Patent Document 4). In the present embodiment, as an example, UF-OFDM is used for description.

The signal transmitting device 81 is provided with a mapping module 11, a frame-format generating module 12, an iFFT module 13, a filter module 14, and a distortion correcting module 15. The mapping module 11 and the frame-format generating module 12 are provided for each channel.

The mapping module 11 maps bit strings in accordance with modulation information. The mapping module 11, for example, maps bit sequences in accordance with QPSK or 16QAM. The frame-format generating module 12 adds preambles in accordance with preamble information. The iFFT (inverse Fast Fourier Transform) module 13 subjects the data of each channel to Fourier inverse transform. The filter module 14 filters the data, which has undergone Fourier inverse transform, in accordance with the scheme of filtered multicarrier. By virtue of this, filtered multicarrier signals are transmitted from the signal transmitting device 81.

Note that the distortion correcting module 15 may be provided to store distortion characteristics, which are generated at the filter module 14, and digitally correct the distortion characteristics, which are generated at the filter module 14, before the iFFT module 13. A configuration provided with both of the filter module 14 and the distortion correcting module 15 may be used. This case is configured so that the distortion characteristics at the filter module 14 can be always fed back.

The signal receiving device 82 is provided with: a receiving module 21, a correlation operating module 22, a STO adjusting module 23, a reference-signal storage module 24, a filter module 25, a FFT module 26, a mapping module 27, a frequency-phase-characteristic operating module 28, and a resampling module 29. The receiving module 21 has a signal level adjusting function for processing hereafter appropriately.

The communication system according to the embodiment uses a filtered-multicarrier communication scheme. Since the signal transmitting device 81 carries out filtering for each subband including 1 ch or more subcarrier(s), the communication system according to the present embodiment is capable of effectively utilizing channels and carrying out tests of the communication scheme which mainly improves the characteristics of ISI (intersymbol interference), ICI (intercarrier interference), and the like.

When the signal receiving device 82 receives the filtered multicarrier signals, data-retrieval timing misses due to a frequency difference from the signal transmitting device 81 or the uncertainties among hardware used in data capturing occur. The filtered multicarrier signals according to the present embodiment are the signals not including CP. Therefore, the signal receiving device 82 according to the embodiment is provided with a synchronization circuit which carries out synchronization by using the signals, which are included in the filtered multicarrier signals, as common reference signals between transmission and reception.

The synchronization circuit is provided with: a received-signal detecting unit, a timing-synchronization adjusting unit, and a phase-synchronization adjusting unit. The correlation operating module 22, the STO adjusting module 23, the reference-signal storage module 24, and the filter module 25 realize the received-signal detecting unit and the timing-synchronization adjusting unit. The FFT module 26, the mapping module 27, the frequency-phase-characteristic operating module 28, and the resampling module 29 realize the phase-synchronization adjusting unit.

The received-signal detecting unit detects the reference signals included in the filtered multicarrier signals. The reference signal includes a first reference signal and a second reference signal set in advance. The timing-synchronization adjusting unit carries out symbol synchronization by using time-sequence information of a symbol(s) included in the first reference signal and carries out time-sequence coarse adjustment. The timing-synchronization adjusting unit may further carry out time-sequence fine adjustment. The phase-synchronization adjusting unit carries out phase synchronization of subcarriers by adjusting the components which change depending on the phase of the subcarrier frequency of the second reference signal.

The filtered multicarrier signal is an aggregate of sine waves related for each subcarrier. Since each sine wave can be also interpreted as eigenvalue information in infinite-dimensional signal space, which forms the signal, it is a simple unique signal. In the embodiment, the eigenvalue information of the sine waves of the set channel is used in the reference signal.

The eigenvalue information of the sine waves can be used as the reference signals within the range of the number of contained subcarriers and further within the range of singularity to a plurality. In the embodiment, at least one symbol obtained from the eigenvalue information of the sine wave is used in the reference signal. The reference signal can be used from a subcarrier 1 ch to subcarriers of a plurality of channels.

The synchronization circuit according to the present embodiment corrects STO (Symbol Timing Offset) and CFO (Carrier Frequency Offset) in the filtered multicarrier scheme without CP by using a preamble pattern serving as the first reference signal and a phase modulation signal serving as the second reference signal, which are included in the reference signals.

The synchronization circuit according to the present embodiment executes following steps. The following information of preamble pattern is shared as common information by the signal transmitting device (hereinafter, Tx) 81 and the signal receiving device (hereinafter, Rx) 82.

Tx 81 transmits the filtered multicarrier signal including the reference signal according to the present embodiment. The reference signal of the present embodiment includes the preamble pattern, which is the first reference signal and is disposed in a particular one or more channel(s) set in advance, and the phase modulation signal, which is the second reference signal.

Step S101: In Rx 82, the preamble pattern of the first reference signal is detected. As a result, a first reference-signal detecting step is executed.

Step S102: In Rx 82, the symbol(s) of the particular channel included in the preamble pattern of the first reference signal is extracted, and STO is adjusted by using the extracted symbol(s). As a result, a timing-synchronization adjusting step is executed.

Step S103: In Rx 82, CFO is adjusted by using the phase modulation signal included in the second reference signal. As a result, a phase-synchronization adjusting step is executed.

FIG. 2 shows an arrangement example of a transmission frame of the reference signal according to the present embodiment. The preamble pattern (first reference signal) of the present embodiment is, for example, a first symbol SY1, which is disposed in a channel CHS1. The preamble pattern may further include a second symbol SY2, which is disposed in a channel CHS2 other than the channel CHS1, and the channels may be increased to 3, 4, and so on in a subcarrier direction. Herein, the case of the channels CHS1 and CHS2 is shown, wherein the symbols are disposed in a time slot(s) before payload of the transmission frame, and the time slot may be a common time slot or mutually different time slots. The channel CHS1 and the other channels may be adjacent to each other or may be separated from each other. For example, in a case in which the preamble pattern serving as the first reference signal is only the first symbol SY1, the time-sequence information thereof is sine waves of the frequency corresponding to SY1; and, in a case in which the preamble pattern serving as the first reference signal is the first symbol SY1 and the second symbol SY2, the first reference signal is a signal of overlapped sine waves of two frequencies.

Meanwhile, the reference signal of the present embodiment further includes a phase modulation signal as the second reference signal. The phase modulation signal is, for example, a third symbol SY3, which is disposed in a time slot after the preamble pattern and is modulated by a phase modulation scheme determined in advance. The third symbol SY3 may be, for example, a QPSK signal included in the payload and may be in an arbitrary channel including a channel common to the channel CHS1 or CHS2.

In step S101, the correlation operating module 22 detects the first symbol and/or the second symbol. In this case, the receiving module 21 receives the filtered multicarrier signal, which has propagated through the test medium (EUT) 83, and subjects a channel signal part thereof to extractive separation. The correlation operating module 22 carries out filtering as well as the filter module 14. In this process, the correlation operating module 22 may detect the third symbol.

In step S102, the correlation operating module 22 extracts the first symbol or the second symbol, and a time interval of the time-sequence information at this point is set to Ts. The first reference signal (which may include the first symbol or the first symbol and the second symbol) shared by Tx 81 and Rx 82 is stored in the reference-signal storage module 24 in advance as a time-sequence signal. For example, it is assumed that the first reference signal is shared by Tx 81 and Rx 82 based on communications standards, past actual measurement data, and the like. The filter module 25 of Rx 82 outputs the stored signals which are stored in the STO adjusting module 23 in advance to the correlation operating module 22. Herein, the filter module 25 stores the information to which the filter characteristics of the filter module 14 and the propagation characteristics of the test medium 83 are reflected, and the reference signal which has passed through the filter module 14 of Tx 81 and the test medium 83 can be reproduced by operation processing.

Figure 3:
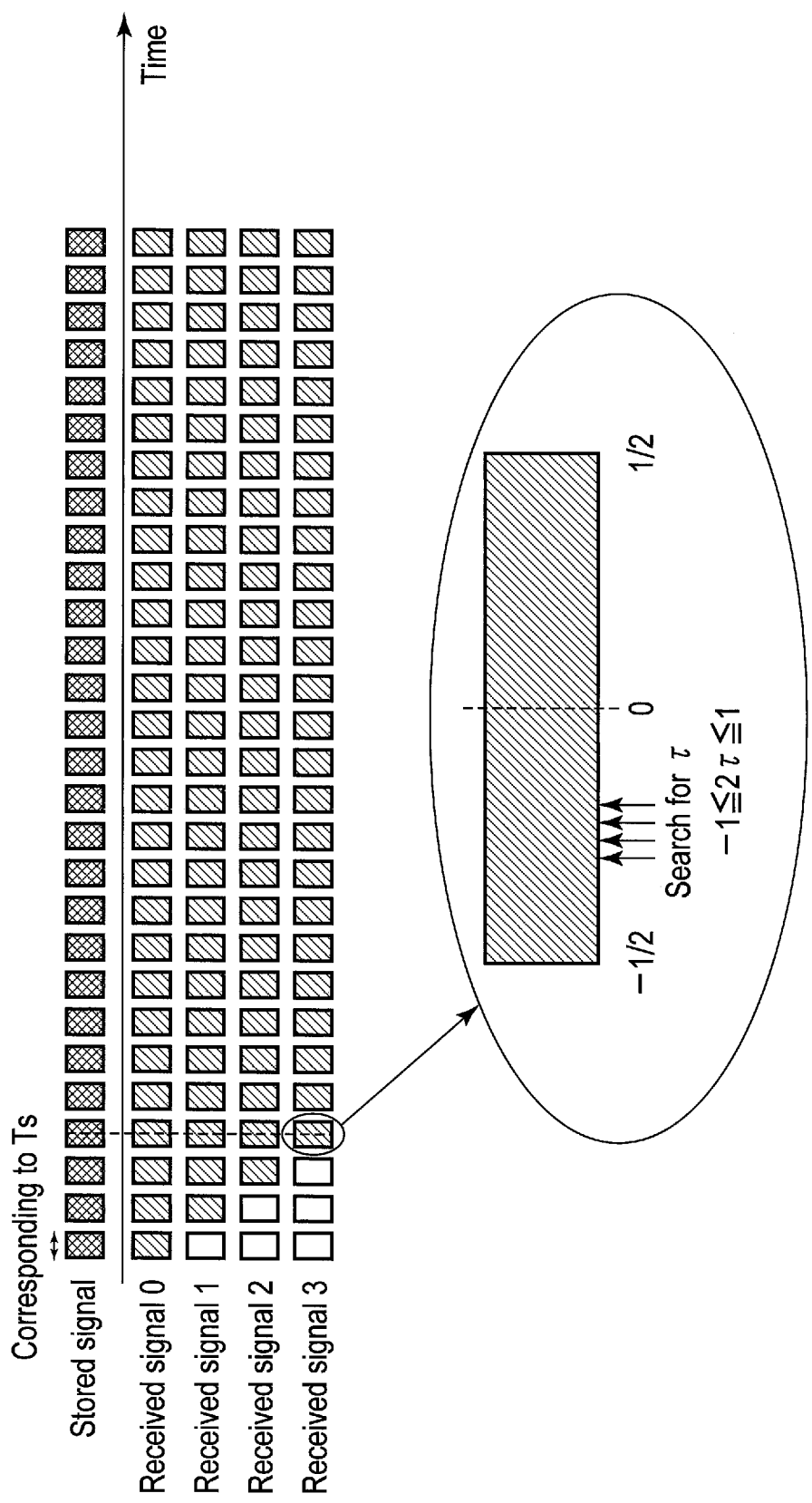
FIG. 3 is an exemplary diagram showing a timing synchronization adjustment example and a phase synchronization adjustment example.

The correlation operating module 22 carries out correlation operation of the stored signal and the received signal. In the correlation operation, as shown in FIG. 3, while the filter module 25 shifts the data of one sequence by every bit at every above described Ts, the correlation operating module 22 carries out correlation operation. Timing synchronization is carried out so that the predetermined result of the correlation operation of the first reference signal, which is included in the received signal, and the information of the first reference signal, which is stored in the reference-signal storage module 24, becomes a predetermined value. The position at which the position of the time-sequence data which provides a maximum value of correlation is symbol-synchronized with the received signal is roughly shown. For example, in a case of the number of subcarriers N (for example, 1024) for each data, the number of time-sequence data is 1024 Ts, and the data is shifted at every 1 Ts. As a result, Rx 82 can subject STO to coarse adjustment and carry out symbol synchronization. In FIG. 3, as shown by a received signal 3, completion of STO adjustment is judged when the value of the correlation operation becomes maximum in the case of shift with 3 Ts.

In step S103, the correlation operating module 22 extracts the third symbol, which is the phase modulation signal, and the FFT module 26, the mapping module 27, the frequency-phase-characteristic operating module 28, and the resampling module 29 obtain a frequency-to-phase characteristic of the third symbol. In extraction of the symbol, for example, resample processing and FFT processing is carried out.

A subcarrier frequency is assumed to be f, and time transition is assumed to be $\tau$; and, in this case, a frequency-to-phase characteristic $\Theta$ of a continuous system is expressed in a following expression. The time transition $\tau$ is a parameter of the resample processing and is included as a variational parameter of $\Theta$. The actual data f is discrete value and is utilized as a discrete expression.

[Mathematical Expression 1]

Searching $\tau(-1.0 \leq 2\tau \leq 1.0)$ $\{\tau | \text{Min}(|\partial\Theta(\tau,f)/\partial f|)$, provided that $\hat{\Theta}(\tau,f) \cong (\partial\Theta)(\tau,f)/\partial f) f+\text{constant}\}$ (1)

The symbol is subjected to resample processing by using $\tau$ as a parameter, and FFT transform is carried out; as a result, the frequency-to-phase characteristic $\Theta$ obtained in Expression (1) is obtained. This $\Theta$ is used as a function of f, and approximation to a linear regression straight line is carried out. When the gradient according to this straight-line approximation becomes zero or approximately zero, a symbol not having phase distortion can be acquired. Therefore, $\tau$ is varied to search for the value of $\tau$ with which the gradient of the straight line according to the straight-line approximation of the frequency-to-phase characteristic obtained by Expression (1) becomes zero or approximately zero. By virtue of this, the symbol of the timing with corrected STO and CFO can be specified. Depending on the way of selecting a reference point of $\tau$, the range of searching of $\tau$ becomes $-0.5 \leq \tau \leq 0.5$ or $0 \leq \tau \leq 1$; however, as long as the search range is 1, the reference point of $\tau$ may be arbitrarily set. The received signal 3 of FIG. 3 is an example of searching for $\tau$ which satisfies the conditions of Expression (1) after STO adjustment. Note that, in this case, $\tau$ is standardized by $T_S$.

Figure 4A:
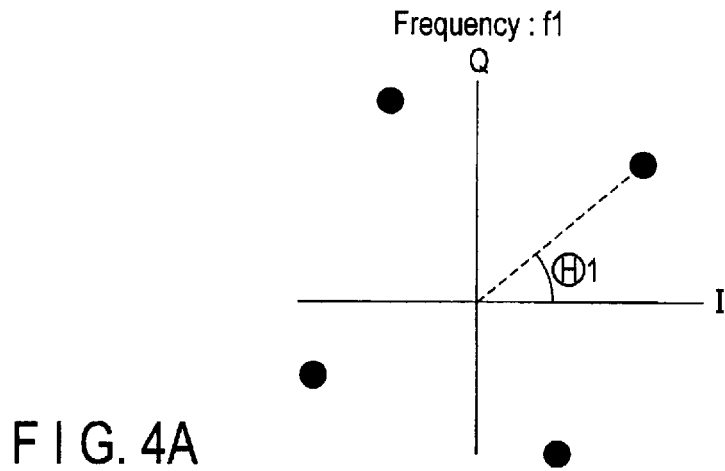
FIGS. 4A, 4B, and 4C are exemplary diagrams showing examples of symbols after mapping.
Figure 4B:
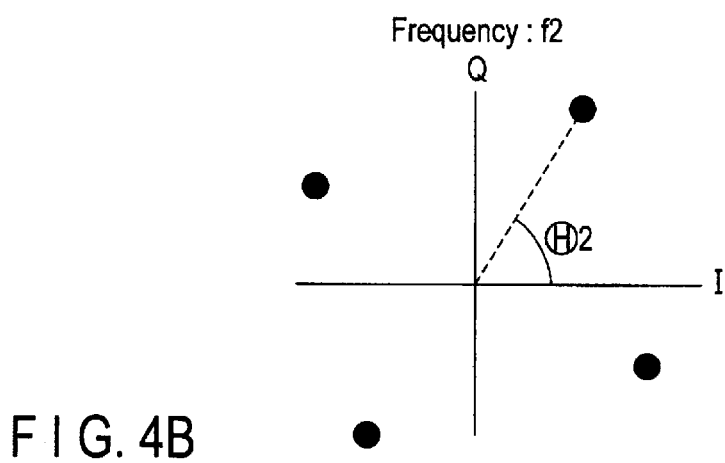
Figure 4C:
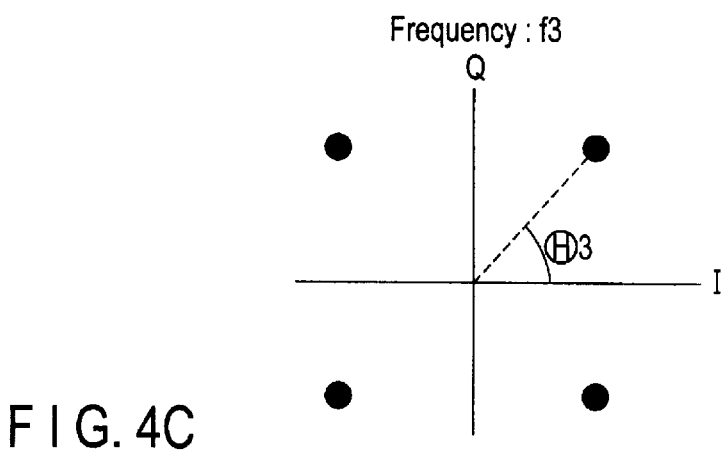

The FFT module 26 subjects the timing-synchronization-corrected third symbol to FFT transform by using the timing-synchronized first symbol information. The mapping module 27 maps the FFT-transformed symbol. FIG. 4 shows examples of the symbol after mapping. FIGS. 4A, 4B, and 4C are examples of extraction of three frequencies in which such N-point mapping is carried out in the entire range of the subcarrier frequencies. Mapping is carried out from f1 to fN, and mapping examples of three frequencies f1, f2, and f3 among them are extracted. Such mapping may be carried out in the entire range of the subcarrier frequencies, or the number of mapping may be the number smaller than N by setting the frequency range as a partial range of the subcarrier frequency range.

Figure 5:
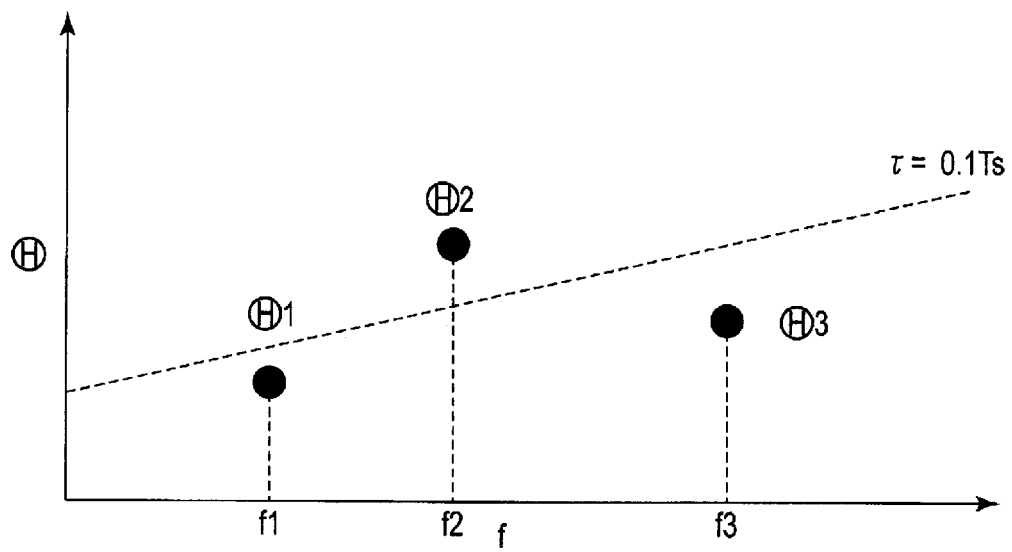
FIG. 5 is an exemplary diagram showing an example of a linear regression straight line of f using frequency-to-phase characteristics $\Theta$.

The frequency-phase-characteristic operating module 28 obtains the frequency-to-phase characteristic Θ of each subcarrier, carries out approximation to a linear regression straight line of f by using the frequency-to-phase characteristics Θ, and, from the gradient according to the straight-line approximation, acquires a phase variation Vp from Tx 81 to the time point of data acquisition of Rx 82. For example, as shown in FIG. 5, the phase variation Vp is calculated by using the frequency-to-phase characteristics Θ.

Figure 6:
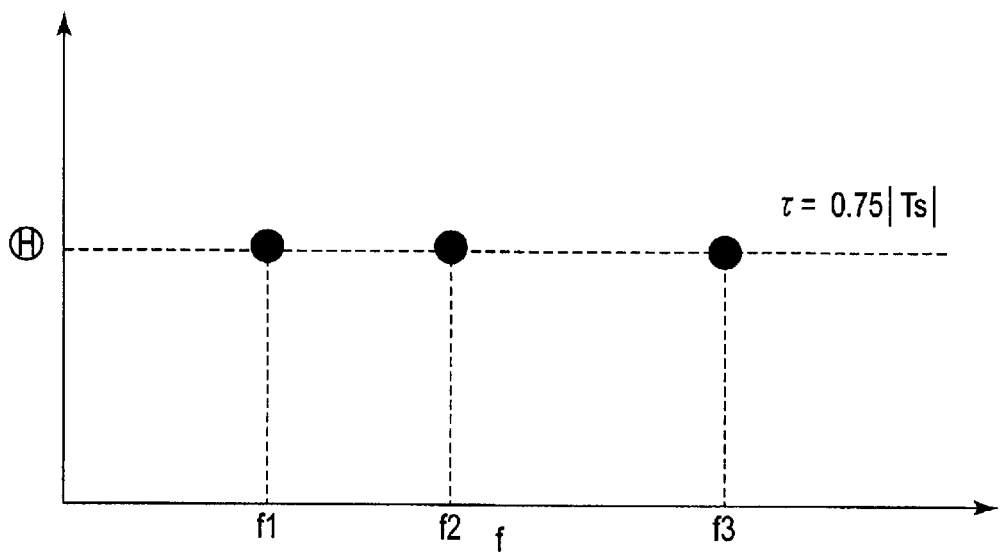
FIG. 6 is an exemplary diagram showing an example of a linear regression straight line of f using frequency-to-phase characteristics $\Theta$ after phase synchronization adjustment.

The resampling module 29 subjects the symbol to resample processing by using the obtained phase variation Vp and using τ as a parameter. The FFT module 26 subjects the symbol after the resampling to FFT transform. In this manner, the signal receiving device 82 of the present embodiment can carry out phase synchronization of subcarriers by repeating the FFT transform, mapping, frequency-phase-characteristic operation, and resampling and searching for the value of τ with which the gradient of the linear regression straight line of f becomes zero or approximately zero, as shown in FIG. 6, to adjust CFO.

FIGS. 7 and 8 show examples of constellation maps of the third symbol. FIG. 7 shows the map before STO and CFO adjustment, and FIG. 8 shows the map after STO and CFO adjustment. It can be understood that phase errors are present in FIG. 7, but the phase errors are resolved in FIG. 8. In other words, a phase-synchronized state is obtained.

As described above, the signal receiving device 82 according to the present embodiment can acquire the synchronized state and carry out regular demodulation action after the correction of timing-mismatched STO and CFO in a test environment of the signals of the filtered multicarrier communication scheme is carried out. This is simple and effective since, particularly, the signals in this scheme can be diverted as synchronization signals, and, as described in a third embodiment, synchronization processing can be carried out by correcting CFO even when external synchronization signals are used.

Second Embodiment: Synchronization Processing Techniques

Figure 9:
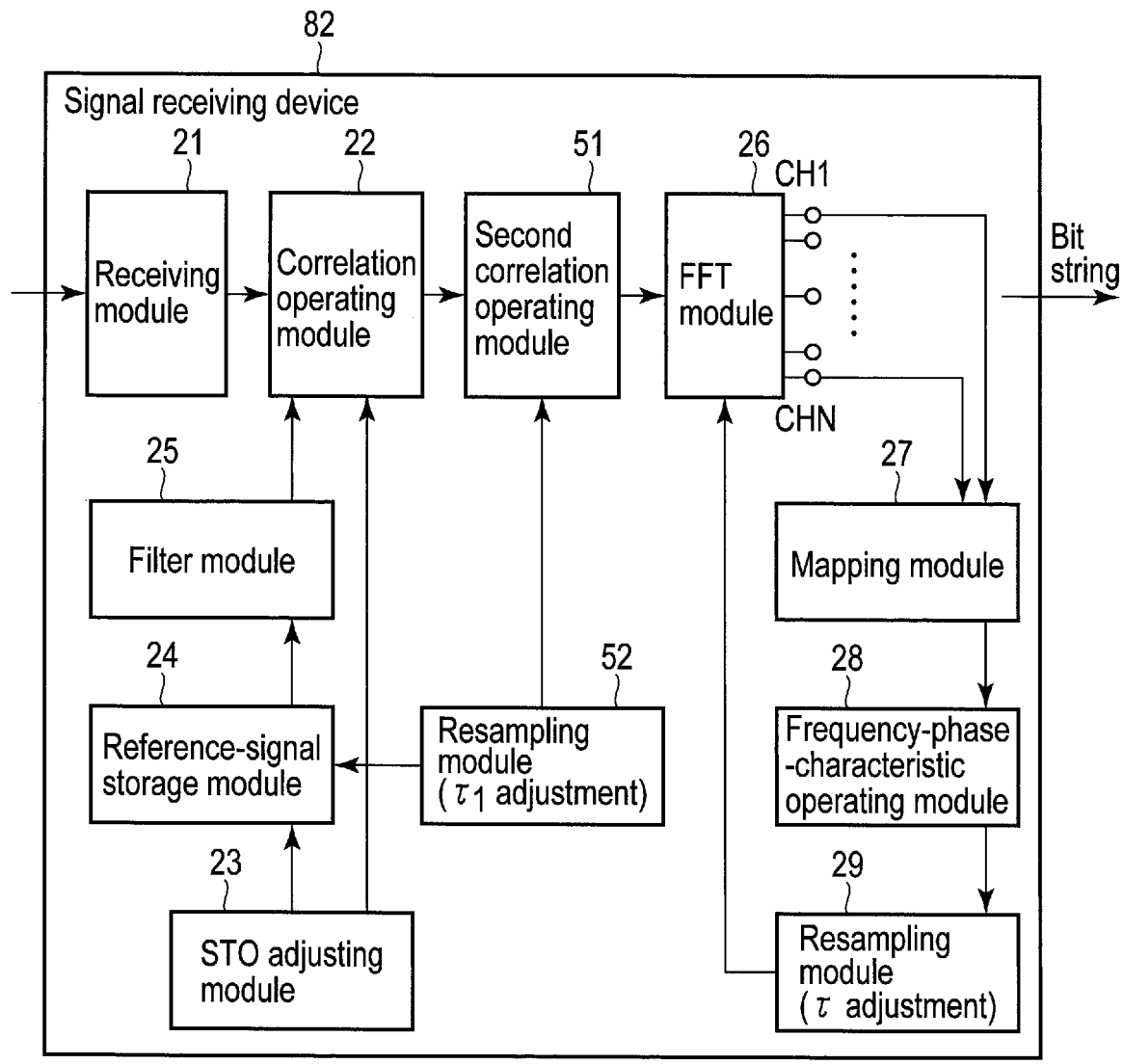
FIG. 9 is an exemplary diagram showing an example of a signal receiving device according to a second embodiment.

FIG. 9 shows an example of a signal receiving device 82 according to the present embodiment. The signal receiving device 82 according to the present embodiment is provided with a synchronization circuit which carries out STO and CFO adjustment by a filtered multicarrier scheme without CP by causing a plurality of pilot signals to be included in an OFDM signal as a first reference signal.

Tx 81 transmits a filtered multicarrier signal including the pilot signals according to the present embodiment. The pilot signals, which are the first reference signal of the present embodiment, include symbols disposed in particular two or more time slots set in advance.

The synchronization circuit according to the present embodiment executes following steps.

Step S201: In Rx 82, the pilot signals, which are the first reference signal of a received signal, are detected. As a result, a first-reference-signal detecting step is executed.

Step S202: In Rx 82, correlation operation of stored pilot signals and the received signal is carried out, and STO is adjusted by using a timing value of the received signal with which correlation becomes maximum. As a result, a timing-synchronization adjusting step is executed.

Step S203: In Rx 82, the timing with which the correlation becomes maximum is searched for in a step narrower than step 202 of the correlation operation to adjust CFO. As a result, the timing-synchronization adjusting step of step 202 can be carried out with higher precision.

Step S204: In Rx 82, CFO is further adjusted by using a phase modulation signal, which is a second reference signal included in a third symbol after processing of steps S202 and S203.

FIG. 10 shows an arrangement example of the pilot signals according to the present embodiment. The OFDM signal of the present embodiment includes pilot signals $S_{pilot}$ of at least one symbol in at least two or more time slots. In the present embodiment, as an example, the pilot signal $S_{pilot}$ is included in each of M time slots. Herein, the pilot signal $S_{pilot}$ can be disposed in one or more arbitrary channel(s). For example, the pilot signal $S_{pilot}$ may be disposed only in a particular channel CHS1.

In step S201, the correlation operating module 22 detects the pilot signal $S_{pilot}$ of each time slot. In this process, the receiving module 21 receives the filtered multicarrier signal which has propagated through the test medium (EUT) 83.

In step S202, the correlation operating module 22 carries out correlation operation of the pilot signal $S_{pilot}$, which is stored in a reference-signal storage module 24 in advance, and a received signal $S_R$. The $S_{pilot}$ used in the correlation operation is generated by operation processing on the assumption that it has passed through a filter module 25 of Rx utilizing the characteristics of a filter module 14 of a Tx side and the characteristics of a test medium 83.

For example, when a parameter which changes the position of time-sequence data for correlation operation is k, correlation operation AC(k) of k is provided by Expression (2).

[Mathematical Expression 2]

$$AC(k) = \sum_{m} S_{pilot} * (m-k) S_R(m) \qquad (2)$$

m represents the position of a time-sequence signal in 1 symbol, and m≤M.

Herein, a CAZAC sequence of which autocorrelation becomes δ function can be used for the pilot signal $S_{pilot}$. The pilot signal $S_{pilot}$ using the CAZAC sequence is, for example, expressed by Expression (4). The pilot signal inserted by a frame-format generating module 12 is in a case in which an exponent function term of time-sequence Expression (4) is 1.

$S_{u,ZC}$ (m) is, for example, Zadoff-Chu (second order CAZAC) sequence and is expressed by Expression (3).

[Mathematical Expression 3]

$$S_{u,zc}(m) = e^{-i\pi \frac{um(m+1)}{N_{ZC}}} \qquad (3)$$

m is an integer, $N_{ZC}$ ($N_{ZC} \leq N$) is the length of a sequence length, and u is a sequence number from 1 to $N_{ZC}-1$. If $N_{ZC}$ is a multiple of 12, the sequences of time slots 1, 2, . . . , 12 can be distinguished by u=1, 2, . . . , 12.

[Mathematical Expression 4]

$$S_{pilot} = S_{u,zc}(m) * e^{-i2\pi cfpn/N} \qquad (4)$$

exp(−i2πcfp·n/N) is a sequence for CFO adjustment. cfp is the value obtained by dividing a minimum value (Δf0) of frequency intervals of subcarriers by an integer K (for example, cfp=Δf0/K=Δf0/100, wherein integer K=100), n is an integer equal to or less than N, and N is a subcarrier total number.

When the exponent function term is 1 in the pilot signal of Expression (4), timing m of a received signal $S_R(m)$ with which an absolute correlation value of the time-sequence signal shown by Expression (2) becomes maximum provides the position of STO. Therefore, in step S202, the value of k with which the correlation obtained by using Expression (5) becomes maximum among the usage of M pilot signals is obtained. However, it is assumed that M≤N. The correlation operating module 22 adjusts STO by using this value of k.

The value with which correlation becomes maximum when the parameter cfp, which is a frequency phase variation component, is varied provides an adjusted value of CFO. Therefore, in step S203, correlation is obtained by using Expression (5) while multiplying a sample point by the parameter cfp, which is the frequency phase variation component, to search for the point at which the correlation becomes maximum. The signal receiving device 82 adjusts CFO by using the value of cfp with which the correlation becomes maximum.

The values of k and cfp with which the correlation becomes maximum use, for example, Expression (5). Pd represents an insertion interval of $S_{pilot}$.

[Mathematical Expression 5]

$$\arg\max_{k,cfp} \sum_{n=0}^{N-1} |AC(k+(n-1)p_d)| \quad (5)$$

The process of Expression (5) is carried out by a resampling module 52 described in FIG. 9. The adjustment of cfp in Expression (5) is described as $\tau_1$ adjustment.

Figure 11:
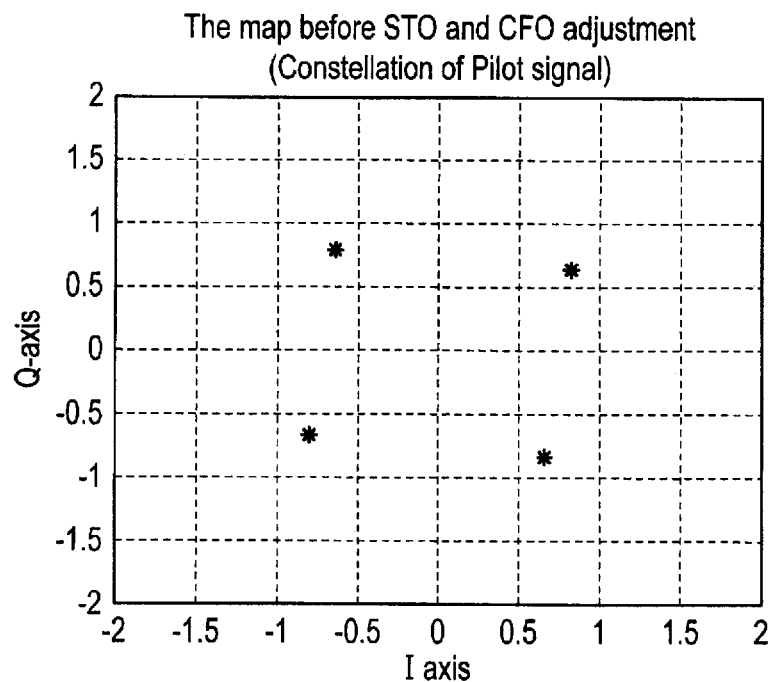
FIG. 11 is an exemplary diagram showing an example of a constellation map of a pilot signal before STO/CFO adjustment in the second embodiment.
Figure 12:
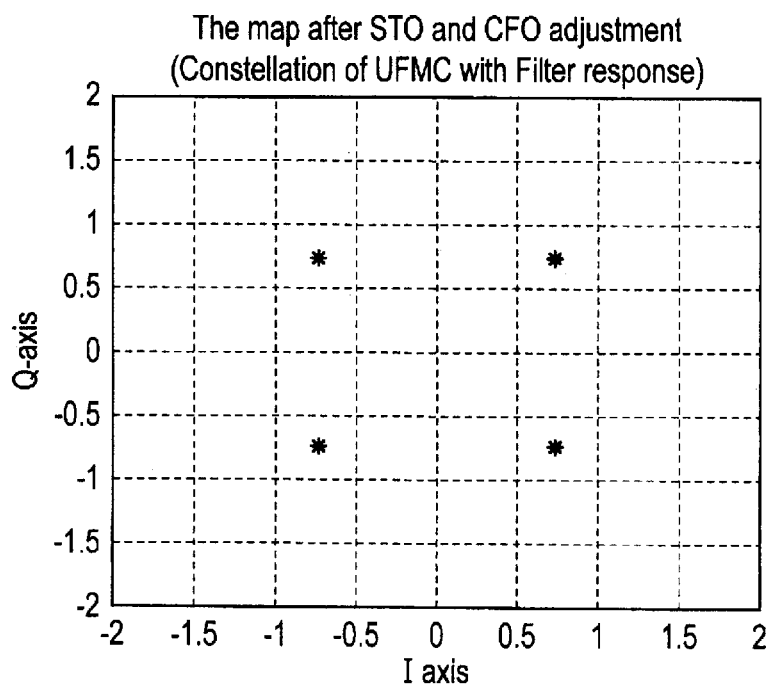
FIG. 12 is an exemplary diagram showing an example of a constellation map of the pilot signal after STO/CFO adjustment in the second embodiment.

FIGS. 11 and 12 show examples of constellation maps of the pilot signals. FIG. 11 shows the map before STO/CFO adjustment, and FIG. 12 shows the map after STO/CFO adjustment. It can be understood that phase errors are present in FIG. 11, but the phase errors are resolved in FIG. 12.

Then, the frequency-phase characteristics in the first embodiment are obtained again by using the phase modulation signal, which is the third symbol transmitted thereafter.

As described above, in the present embodiment, the synchronized state of timing-mismatched STO and CFO in the test environment of the signals of the filtered multicarrier communication scheme is acquired, and, particularly, the signals in this scheme can be diverted as synchronization signals. Therefore, this is simple and effective.

Third Embodiment: Synchronization Processing Techniques

Figure 13:
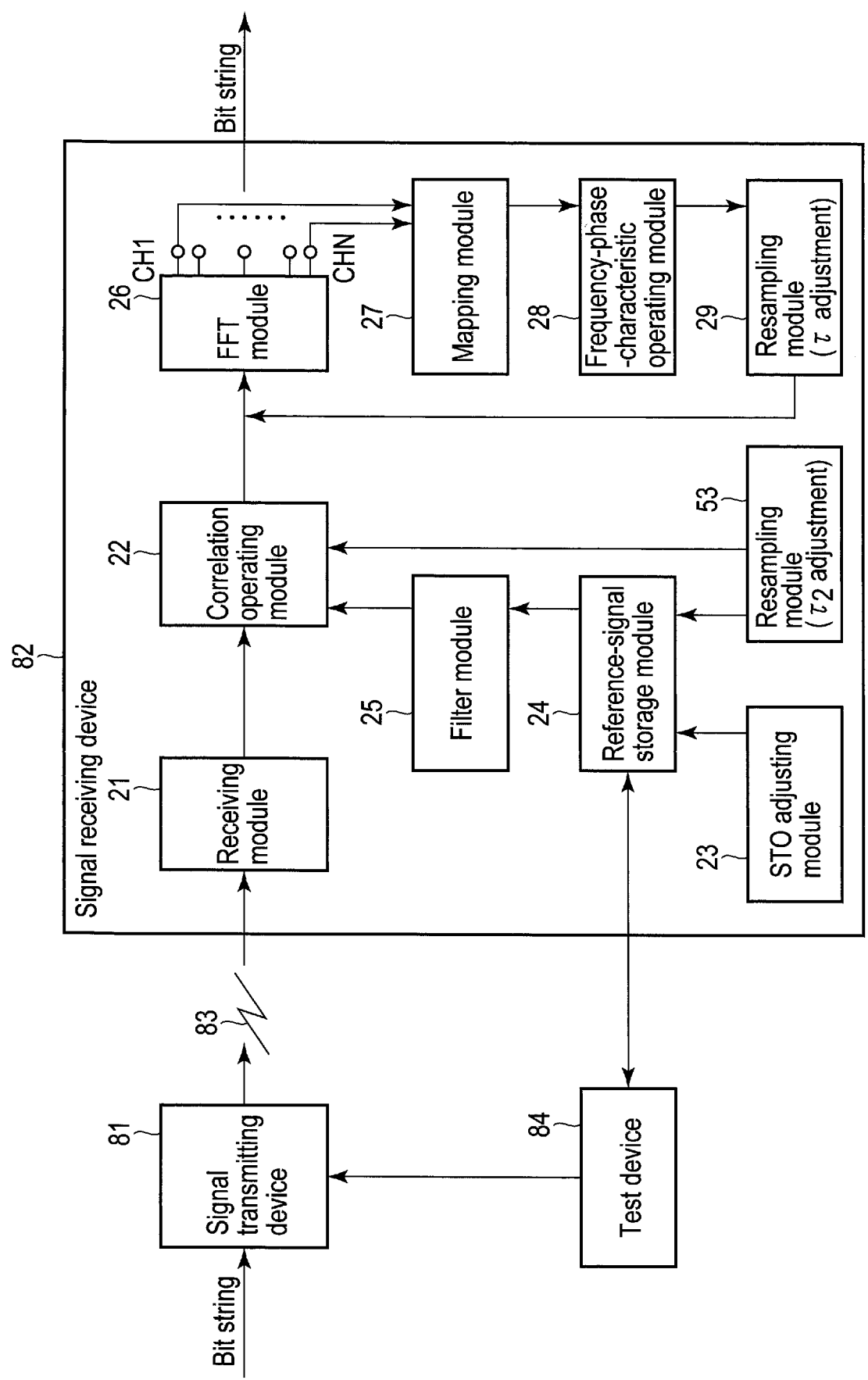
FIG. 13 is an exemplary diagram showing an example of a system configuration according to a third embodiment.

FIG. 13 shows an example of a system configuration according to the present embodiment. A communication system according to the embodiment is provided with a signal transmitting device (SG) 81, and a signal receiving device (SA) 82, and a test device 84. The test device 84 provides a synchronization signal for carrying out a zone evaluation test of a test medium 83, which connects the signal transmitting device 81 and the signal receiving device 82 to each other. This synchronization signal may be provided from the signal transmitting device 81. The test medium 83 may be wired or wireless.

The signal transmitting device 81 transmits an external synchronization signal together with an OFDM signal. The external synchronization signal is coincident with the OFDM signal before or after a filter module 14 of the transmitting device. The external synchronization signal of the present embodiment is an arbitrary signal capable of adjusting STO and, for example, may be a clock signal which oscillates at symbol intervals at the same time as start of the transmitting signal of Tx. Correlation with a received signal is obtained by using the clock signal as a reference signal to adjust STO and CFO.

The signal receiving device 82 according to the present embodiment executes following steps.

Step S301: In Rx 82, the external synchronization signal which is a first reference signal is detected.

Step S302: In Rx 82, STO is adjusted by using the external synchronization signal, which is the first reference signal.

Step S303: In Rx 82, CFO is adjusted in a manner as described in the first or second embodiment.

The clock signal used in correlation operation is generated in operation processing on the assumption that it has passed through a filter module 25 of Rx utilizing filter characteristics of the filter module 14 and propagation characteristics of the test medium 83.

Figure 14:
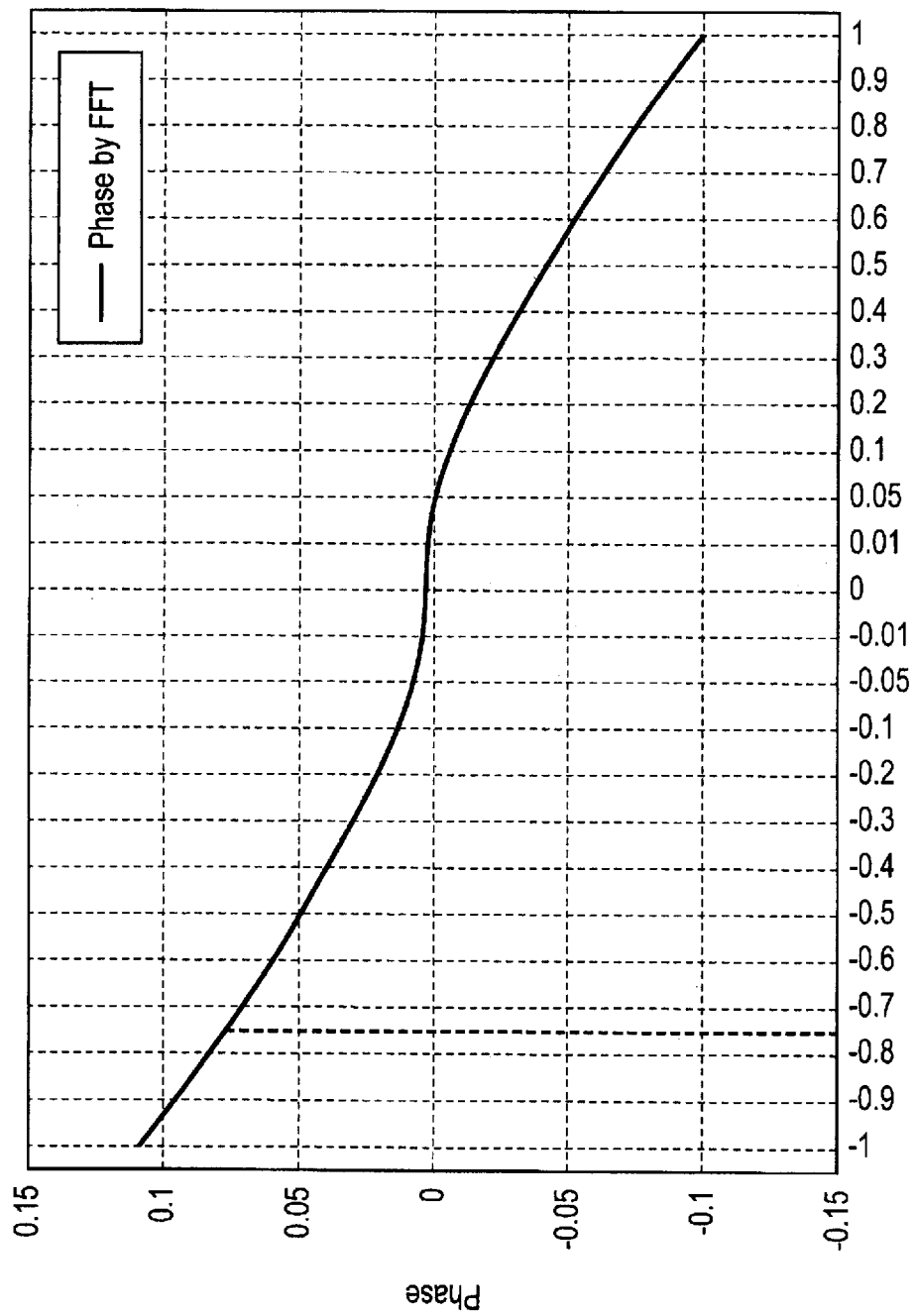
FIG. 14 is an exemplary diagram showing a conversion table of a time variation step $\tau_2$ and phases.

Based on the external synchronization signal of the test device 84, data capturing in the signal receiving device 82 is started, and data capturing is carried out with a change of indeterminate time $\tau_2$ from this time point. A phase variation corresponding to $\tau_2$ is included in above described Vp. The conversion to this phase information may use, for example, a conversion table as shown in FIG. 14. A vertical axis represents phases expressed by radians. A horizontal axis represents time $\tau_2$, wherein symbol time Ts is 1. As shown in FIG. 14, $\tau_2$ is preferred to be changed with precision of about 1/100 of the symbol time Ts. CFO can be adjusted by subtracting the phase information of this conversion table from Vp. $\tau_2$ described in a resampling module 53 of FIG. 13 corresponds to changing with the precision of about 1/100 of the symbol time Ts. In this manner, timing synchronization adjustment can be carried out with high precision.

In step S301, a correlation operating module 22 receives the external synchronization signal. In this process, the signal receiving device 82 may detect a phase modulation signal (second reference signal), which is a third symbol.

In step S302, the correlation operating module 22 obtains the symbol time Ts by using the external synchronization signal. As a result, the signal receiving device 82 adjusts STO and carry out symbol synchronization.

Then, frequency-phase characteristics of the first embodiment are obtained again by using the phase modulation signal, which is the second reference signal transmitted at the same time as the external synchronization signal, or the second reference signal transmitted thereafter, in other words, the phase modulation signal, which is the third symbol.

Next, signal generating techniques according to signal generating circuits and signal generating methods will be described in a fourth embodiment to an eighth embodiment. Note that the signal generating devices according to the fourth embodiment to the eighth embodiment take on the tasks of the processes executed in the devices provided in the systems described in the first embodiment to the third embodiment. Therefore, in addition to the signal generating process contents described below, the correspondences to the processes described in the first embodiment to the third embodiment will be also described.

Fourth Embodiment: Signal Generating Techniques

Figure 15:
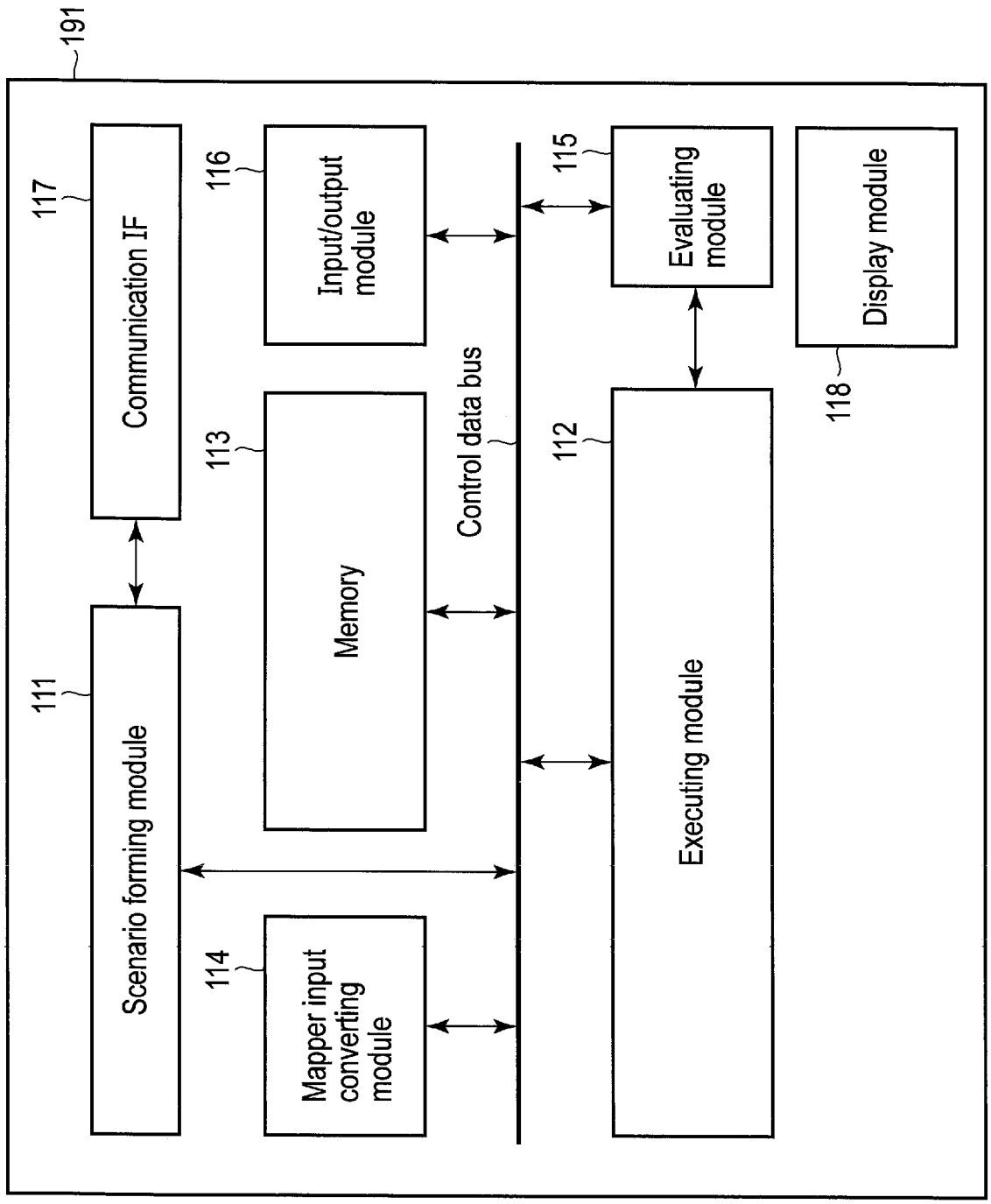
FIG. 15 is an exemplary brief configuration diagram showing an example of a signal generating device according to a fourth embodiment, a fifth embodiment, a sixth embodiment, and a seventh embodiment.

FIG. 15 shows a signal generating device according to the fourth embodiment. This signal generating device carries out operation in the devices provided in the system according to the above described synchronization processing techniques. Multicarrier signals require setting of modulation type of subcarriers and the number of the subcarriers depending on the characteristics of a medium through which wireless signals are transmitted. Therefore, in an environment to evaluate multicarrier signals, a signal source of various multicarrier signals with mutually different numbers of subcarriers, modulation schemes, filtering schemes, and the like, is required.

In the environment to evaluate the multicarrier signals, the signal source which generates various multicarrier signals is required. On the other hand, a signal source used in the environment to evaluate multicarrier signals is desired to have a simple configuration.

Variations of the multicarrier signals are generated by combinations of the numbers of subcarriers, modulation schemes, filtering schemes, and the like. Therefore, the inventor of this signal generating device have found that, in order to obtain a simpler configuration method as a configuration of signal processing of generating multicarrier communication, a way of comprehending a system based on abstract input/output is effective.

In FIG. 15, a signal generating device 191 is provided with a CPU, which functions as an executing module 112, and generates an output signal y, which includes a multicarrier signal, with respect to an input signal u, which includes a code sequence. The signal generating device 191 is provided with a memory 113, which stores state variables (described later) and operational matrices. The signal generating device 191 is provided with an input/output module 116 and a communication IF 117 for carrying out remote control.

The input signal u is input to the input/output module 116, and the input/output module 116 generates the output signal y. The configurations are connected by a data connection bus and a control bus. The input/output module 116 may have a function to adjust to interfaces unique to a RF modulation module such as a data format, code, and arrangement in addition to the function of data input/output. Herein, the input signal u corresponds to the bit string of the signal transmitting device 81 of the first embodiment to the third embodiment, and the output signal y corresponds to the output signal from the filter module 14 of the first embodiment to the third embodiment.

A signal type of the multicarrier signal is input to the input/output module 116. The signal type is arbitrary, and examples thereof include UF-OFDM, CP-OFDM, FBMC, filtered OFDM, GFDM, and Windowing-OFDM. Furthermore, arbitrary information required for generating multicarrier signals such as the number of subcarriers, modulation scheme, filtering scheme, and presence/absence of synchronization signal may be input to the input/output module 116. Herein, the number of subcarriers, the modulation scheme, and the filtering scheme input to the input/output module may be utilized to the characteristics of the mapping module 11, the frame-format generating module 12, the iFFT module 13, the filter module 14, and the distortion correcting module 15 of the signal transmitting device 81 of the first embodiment to the third embodiment.

The CPU provided in the signal generating device 191 further functions as a scenario forming module 111. The scenario forming module 111 forms a scenario in a case of generating a multicarrier signal and controls the executing module 112 in accordance with the scenario. The executing module 112 executes operation processing by using an operator set by the scenario forming module 111. The Mapper input converting module 114 has a function to convert each element of the input signal u, which includes the desired code sequence, to a (I, Q) signal pair corresponding to the predetermined modulation scheme. Herein, the Mapper input converting module 114 corresponds to the mapping module 11 of the signal transmitting device 81 of the first embodiment to the third embodiment.

The input signal u has amplitude phase information data for conversion to amplitude phase information of sine waves (hereinafter, this will be referred to as primary modulation). The primary modulation may use digital signals I/O, but is not limited to signals of a cornered wide band such as I/O information. When the input signal u is not a signal of a cornered wide band, the occupied band owned by the signal can be reduced.

For example, in a case in which the input signal u of 6 bits is used, eight ways of numerical values generated from first 3 bits are assumed to be I, eight ways of numerical values generated from next coming 3 bits are assumed to be Q, and conversion onto a two-dimensional map is carried out. In this case, 64 ways of mapping points of 8*8 are formed. This is a functional action of a mapper, and, when these (I, Q) pairs are converted by iFFT, a time sequence on which amplitude-phase-information-given many sine waves (subcarriers) are superimposed is obtained. This is an OFDM signal.

The multicarrier signal can be expressed by a matrix using frequencies as dimensions. Therefore, the input signal u is allocated to each subcarrier, and, as described below, the input signal u and the output signal y are expressed by an input vector U and an output vector Y, which are expressed by vectors.

$$U = \begin{bmatrix} u(0) \\ \vdots \\ u(N-1) \end{bmatrix} \quad (101)$$

$$Y = \begin{bmatrix} y(0) \\ \vdots \\ y(N-1) \end{bmatrix}$$

Herein, i=0, 1, ..., N−1 are subcarriers. Hereinafter, in order to facilitate understanding, a case in which the number N of subcarriers is 4 will be described.

The input vector U is an arbitrary code sequence including 1/0. The scenario forming module 111 uses the input vector U corresponding to the generated multicarrier signal. FIG. 16 shows a signal arrangement example of the multicarrier signal. When the scenario forming module 111 selects the input vector U, the signal generating device 191 can generate, for each symbol, an arbitrary multicarrier signal used in the filtered multicarrier communication scheme. The generated multicarrier signal may be a preamble signal $S_{pab}$, may be a control signal, or a payload signal. The payload signal may include a pilot signal $S_{pit}$. The input vector U corresponding to the generated multicarrier signal may be generated by using an operator for numerical value conversion. Herein, in the frame-format generating module 12 of the signal transmitting device 81 of the first embodiment to the third embodiment, arbitrary multicarrier signals can be generated.

If arbitrary operation processing carried out for the input vector U when the multicarrier signal is to be generated is assumed to be an operator AR, the operation processing can be expressed as ARU. In the filtered multicarrier signal communication scheme, since processing is carried out in the order of: modulation, frequency multiplexing, and filtering, the operation processing has to be carried out a plurality of times until the output signal y is generated. Therefore, a state variable x is used. A state vector X expressing the state variable x by a vector can be expressed by, for example, a following expression.

[Mathematical Expression 102]

$$X_k = A_k X_{k-1} + B_k U \quad (102)$$

A is an operator expressing the operation processing to be carried out for the state vector X. The operators A and B function as signal generation operators which are required for generating the multicarrier signal.

Expression (102) is a state-space expressing expression at each time point specified by a suffix k; wherein, a state vector $X_0$ with k=0 is a matrix with all 0 (hereinafter, described as {0}). An arbitrary multicarrier signal can be generated by varying the operators A and B depending on the signal to be generated. The state vectors $X_k$ are sequentially derived by using the operators A and B, and the output vector Y is generated at an appropriate time point k.

In a signal-evaluation-test environment stage of the multicarrier communication scheme, it is preferred that evaluation can be carried out with environmental characteristics added to the multicarrier signal. Therefore, the output vector Y is expressed in a following manner.

[Mathematical Expression 103]

$$Y = C_k X_k + D_k V \quad (103)$$

Herein, C is an operator expressing the operation processing to be carried out for the state vector, V is a disturbance vector representing disturbance v of each subcarrier, and D is an operator expressing the operation processing to be carried out for the disturbance vector. The operators C and D function as characteristic addition operators which are required for adding characteristics to the multicarrier signal. As a result, the multicarrier signal to which transmission-path characteristics and disturbance are added can be generated. Note that the multicarrier signal reflecting the propagation characteristics, and the like of the test medium 83 of FIG. 1 of the first embodiment to the third embodiment can be also generated.

If the transmission-path characteristics and disturbance are not taken into consideration, the operator C becomes an identity matrix (hereinafter, described as {E} or E), and DV becomes {0}. An arbitrary multicarrier signal desired to be evaluated can be generated by varying the operators C and D depending on the signal to be generated.

The operators are not mathematically determined, but are determined by input/output designs. The scenario forming module 111 varies the operators, which are to be executed by the executing module 112, depending on the multicarrier signal to be generated. For example, the scenario forming module 111 varies the operators A and B in the order of: modulation, frequency multiplexing, and filtering in order to generate the multicarrier signal. This processing respectively corresponds to the processing of the frame-format generating module 12, the iFFT module 13, and the filter module 14 of the signal transmitting device 81 of the first embodiment to the third embodiment.

Examples of the operators which function as signal generation operators include the following.

$M_M$: An operator which maps the input signal u at the symbol point corresponding to the modulation scheme.

$M_T$: An operator which carries out time-axis symbol multiplexing.

Note that the operator $M_M$ corresponds to the processing of the mapping module 11 and the frame-format generating module 12 of the signal transmitting device 81 of the first embodiment to the third embodiment.

The modulation scheme is arbitrary and is, for example, 16QAM (Quadrature Amplitude Modulation). In a case of a modulation scheme in which one symbol is expressed by a symbol point on orthogonal coordinates of an I axis and a Q axis, a code sequence of the input signal u can be expressed by the pair of u=(uI(i), uQ(i)) (i=0, 1, 2, . . . ) (i is the number of the code sequence). Herein, this example is shown separately by I components and Q components on the assumption of the result of the input signal u after conversion; and, in this case, these are separately subjected to procedural operation.

The input vector U can be expressed by, for example, a following expression. The two matrices expressed in the right sides of Expression (104) can be mutually converted by Expression (105).

[Mathematical Expression 104]

$$U = \begin{bmatrix} u_I(0) + ju_Q(0) \\ u_I(1) + ju_Q(1) \\ u_I(2) + ju_Q(2) \\ u_I(3) + ju_Q(3) \end{bmatrix} = \begin{bmatrix} u_I(0) & u_Q(0) \\ u_I(1) & u_Q(1) \\ u_I(2) & u_Q(2) \\ u_I(3) & u_Q(3) \end{bmatrix} \quad (104)$$

[Mathematical Expression 105]

$$\begin{bmatrix} u_I(0) & u_Q(0) \\ u_I(1) & u_Q(1) \\ u_I(2) & u_Q(2) \\ u_I(3) & u_Q(3) \end{bmatrix} \begin{bmatrix} 1 & 1 & 1 & 1 \\ j & j & j & j \end{bmatrix} = \begin{bmatrix} u_I(0) + ju_Q(0) \\ u_I(1) + ju_Q(1) \\ u_I(2) + ju_Q(2) \\ u_I(3) + ju_Q(3) \end{bmatrix} \quad (105)$$

The operator $M_M$ is expressed, for example, by a following expression.

[Mathematical Expression 106]

$$M_M = \mathrm{diag}[\, b_0 \; b_1 \; b_2 \; b_3 \,] = \begin{bmatrix} b_0 & 0 & 0 & 0 \\ 0 & b_1 & 0 & 0 \\ 0 & 0 & b_2 & 0 \\ 0 & 0 & 0 & b_3 \end{bmatrix} \quad (106)$$

Figures 17, 18:
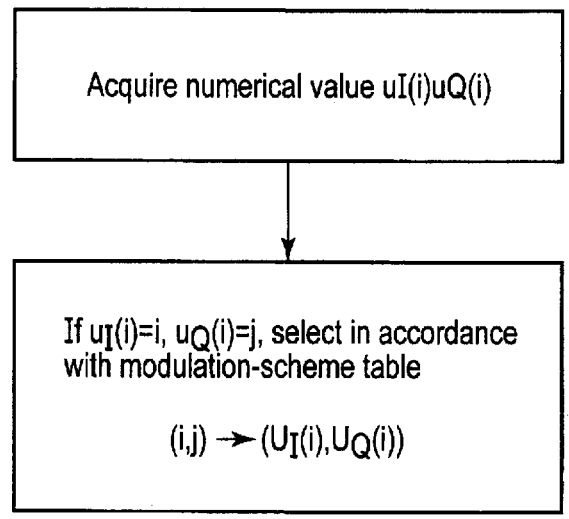
FIG. 17 is an exemplary explanatory diagram showing an example of an allocation step.
FIG. 18 is an exemplary diagram showing an example of an input vector.

In a procedural operation of Mathematical Expression (106), $b_0$ acts on $u_I(0)$, $u_Q(0)$ in accordance with a normal matrix product operation. At this point, as shown in Expression (107), $(u_I, u_Q)$ values are allocated to (I, Q) numerical values in accordance with a modulation scheme. An allocating step is shown in FIG. 17.

[Mathematical Expression 107]

$$\begin{bmatrix} b_0 & 0 & 0 & 0 \\ 0 & b_1 & 0 & 0 \\ 0 & 0 & b_2 & 0 \\ 0 & 0 & 0 & b_3 \end{bmatrix} U = \begin{bmatrix} U_I(0) + jU_Q(0) \\ U_I(1) + jU_Q(1) \\ U_I(2) + jU_Q(2) \\ U_I(3) + jU_Q(3) \end{bmatrix} \quad (107)$$

By deriving $U_I(i)+jU_Q(i)$, the input signal u(i) can be mapped at a symbol point for each subcarrier i. Since elements b constituting the operator $M_M$ are determined for each modulation scheme, the value of $U(i)=U_I(i)+jU_Q(i)$ corresponding to an arbitrary modulation scheme can be derived. Therefore, the input signals u included in the input vector U can be mapped by the arbitrary modulation scheme.

For example, in a case in which the modulation scheme is 16QAM, when the input vector U is expressed by $p_{ij}$, $b_{ij}$ becomes the table shown in FIG. 18. Parentheses in the diagram show (I, Q) components. Target modulation schemes are BPSK, QPSK, Mary-QAM, Offset QAM, and the like.

The operator $M_T$ can be expressed by, for example, following expression.

[Mathematical Expression 108]

$$X_k = M_T X_{k-1} = \begin{bmatrix} 1 & 0 & \cdots & 0 \\ 0 & 1 & & 0 \\ \vdots & & \ddots & \vdots \\ 0 & 0 & \cdots & 1 \end{bmatrix} \begin{bmatrix} x_{k-1}(0) \\ x_{k-1}(1) \\ x_{k-1}(2) \\ x_{k-1}(3) \end{bmatrix} \quad (108)$$

Examples of the operator which functions as the signal generation operator include the following.

$T_{iFFT}$: An operator which carries out Fast Fourier inverse transform

The operator $T_{iFFT}$ is one of the operators used in the processing of the iFFT module of the signal transmitting device 81 of the first embodiment to the third embodiment.

$T_{iDFT}$: An operator which carries out discrete-time Fourier inverse transform The operator $T_{iDFT}$ is one of the operators used in the processing of the iFFT module of the signal transmitting device 81 of the first embodiment to the third embodiment.

$T_{FFT}$: An operator which carries out fast Fourier transform

The operator $T_{FFT}$ is one of the operators used in the processing of the FFT module 26 of the signal transmitting device 81 of the first embodiment to the third embodiment.

$T_{DFT}$: An operator which carries out discrete-time Fourier transform

The operator $T_{DFT}$ is one of the operators used in the processing of the FFT module 26 of the signal transmitting device 81 of the first embodiment to the third embodiment.

The discrete-time Fourier inverse transform and Fourier transform are expressed by following expressions, respectively.

[Mathematical Expression 109]

$$f(n) = 1/N \sum_{k=1}^{N-1} F(k) W^{-nk} (n=1,2,\ldots,N-1)$$

$$W = e^{-j2\pi/N} \quad (109)$$

[Mathematical Expression 110]

$$F(k) = \sum_{n=0}^{N-1} f(n) W^{nk} (k=0,1,\ldots,N-1) \quad (110)$$

Herein, $W=\exp(-j2\pi/N)$ is referred to as a twiddle factor. N is the total number of conversion elements, and n and k are interpreted as variables corresponding to a time sequence and a frequency sequence, respectively. Discrete sampling time is normalized by 1.

The operator $T_{DFT}$ is expressed by, for example, a following expression. A case of N=4 is shown. W is a twiddle factor.

[Mathematical Expression 111]

$$X_k = T_{DFT} X_{k-1} = \begin{bmatrix} W^0 & W^0 & W^0 & W^0 \\ W^0 & W^1 & W^2 & W^3 \\ W^0 & W^2 & W^4 & W^6 \\ W^0 & W^3 & W^6 & W^9 \end{bmatrix} \begin{bmatrix} x_{k-1}(0) \\ x_{k-1}(1) \\ x_{k-1}(2) \\ x_{k-1}(3) \end{bmatrix} \quad (111)$$

The operator $T_{iDFT}$ which carries out discrete-time Fourier inverse transform is as the following expression. A case of N=4 is shown.

[Mathematical Expression 112]

$$X_k = T_{iDFT} X_{k-1} = 1/4 \begin{bmatrix} W^0 & W^0 & W^0 & W^0 \\ W^0 & W^{-1} & W^{-2} & W^{-3} \\ W^0 & W^{-2} & W^{-4} & W^{-6} \\ W^0 & W^{-3} & W^{-6} & W^{-9} \end{bmatrix} \begin{bmatrix} x_{k-1}(0) \\ x_{k-1}(1) \\ x_{k-1}(2) \\ x_{k-1}(3) \end{bmatrix} \quad (112)$$

There are relations that the operator $T_{FFT}$ is an inverse matrix $T_{iFFT}^{-1}$ of $T_{iFFT}$ and that the operator $T_{iDFT}$ which carries out discrete-time Fourier inverse transform is an inverse matrix $T_{DFT}^{-1}$ of $T_{DFT}$, and they are usable.

Examples of the operator which functions as the signal generation operator include the following. By using the filters thereof, OOB (Out-of-band) reduction and support to a filtered scheme are enabled.

$F_U$: An operator which carries out filtering processing in a frequency region for each subcarrier.

$F_P$: An operator which carries out filtering processing for time-series format signals of a plurality of subcarriers.

$F_{PR}$: An operator which carries out cyclic convolution filtering processing.

$F_{PPN}$: An operator which carries out filtering processing of a polyphase format for a plurality of subcarriers.

$F_{DET}$: An operator which carries out processing of arranging in a time transfer direction with output timing changed for each filtering data.

$F_C$: An operator which carries out frequency characteristic correction of filtering.

$F\beta$: is a coefficient operator required in preprocessing and is a coefficient complex multiplication which comes to a previous stage of iFFT. This has a configuration equivalent to above described Fc.

Herein, $F_U$ is the processing inserted between the frame-format generating module 12 and the iFFT module 13 of FIG. 1. The processing of $F_P$, $F_{PR}$, $F_{PPN}$, and $F_{DET}$ is carried out in the filter module 14 of FIG. 1. Meanwhile, $F_C$ and $F\beta$ are processing carried out in the distortion correcting module 15 of the first embodiment to the third embodiment.

The operator $F_U$ is a filtering operator in a frequency region and is expressed by, for example, a following expression.

[Mathematical Expression 113]

$$X_k = F_U X_{k-1} = \begin{bmatrix} fu_0 & 0 & 0 & 0 \\ 0 & fu_1 & 0 & 0 \\ 0 & 0 & fu_2 & 0 \\ 0 & 0 & 0 & fu_3 \end{bmatrix} \begin{bmatrix} x_{k-1}(0) \\ x_{k-1}(1) \\ x_{k-1}(2) \\ x_{k-1}(3) \end{bmatrix} \quad (113)$$

Herein, fu is a complex number and provides a frequency phase characteristic of a subcarrier to carry out filtering.

On the other hand, if an impulse response of the filter in a time region is g(i), in a case in which a filter of M taps is provided in discrete time, the output after filtering is expressed by a convolution sum of a following expression in a discrete region.

[Mathematical Expression 114]

$$X_k = F_P X_{k-1} = \sum_{m=0}^{M-1} x_{k-1}(i) g(i-m) \quad (114)$$

Herein, m=0, 1, 2, ..., M−1, and i=0, 1, 2, ..., N−1.
For example, output $x_k(i)$ in a case of M=3 and i=0, 1, 2 is as the following.

$x_k(0) = x_{k-1}(0)g(0)$ $x_k(1) = x_{k-1}(1)g(1) + x_{k-1}(1)g(0)$ $x_k(2) = x_{k-1}(2)g(2) + x_{k-1}(2)g(1) + x_{k-1}(2)g(0)$

Figure 19:
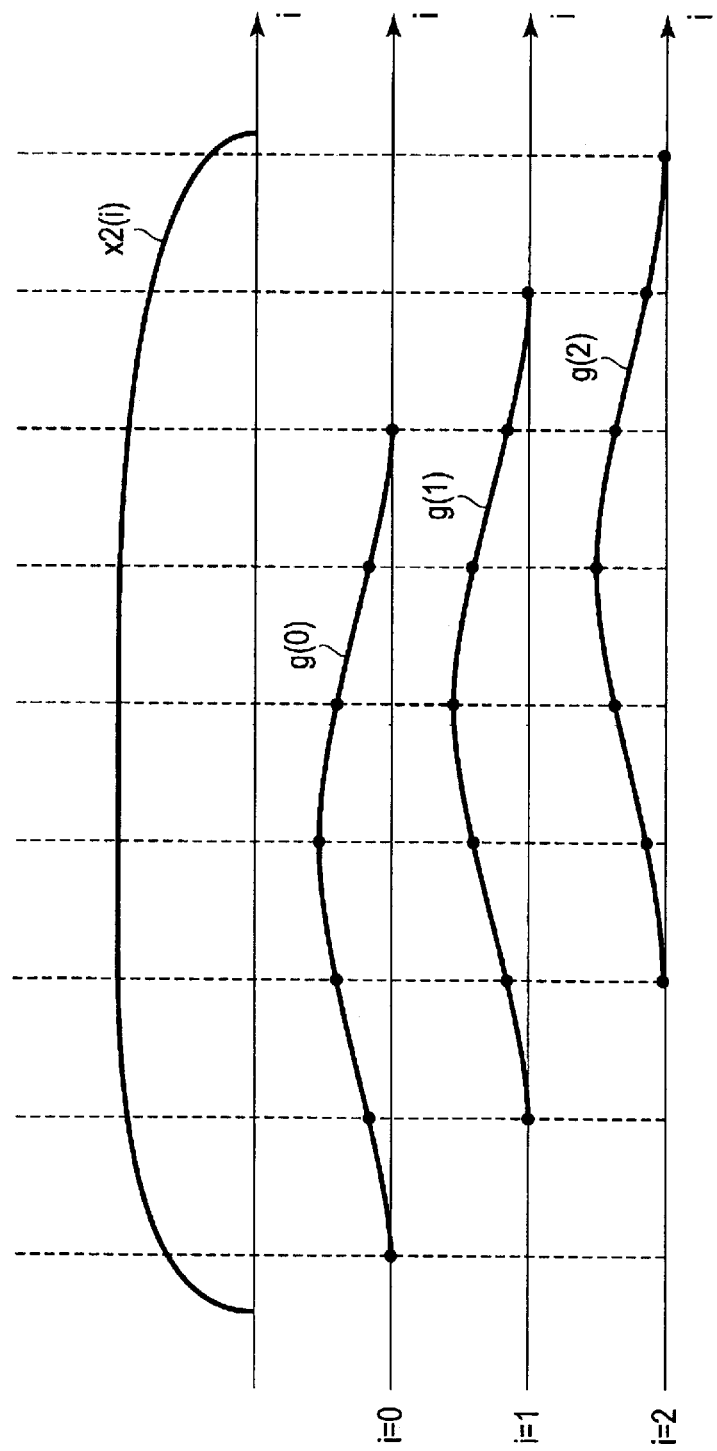
FIG. 19 is an exemplary diagram showing an example of state variables and impulse responses.

Examples of a state variable $x_2(i)$ and an impulse response g(i) of this case are shown in FIG. 19.

The operator $F_P$ is expressed, for example, by a following expression if a case in which a tap length of a g(i) filter is 3 is taken as an example.

[Mathematical Expression 116]

$$X_k = F_P X_{k-1} = \begin{bmatrix} g(0) & 0 & 0 & 0 \\ g(1) & g(0) & 0 & 0 \\ g(2) & g(1) & g(0) & 0 \\ 0 & g(2) & g(1) & g(0) \\ 0 & 0 & g(2) & g(1) \\ 0 & 0 & 0 & g(2) \end{bmatrix} \begin{bmatrix} x_{k-1}(0) \\ x_{k-1}(1) \\ x_{k-1}(2) \\ x_{k-1}(3) \end{bmatrix} \quad (116)$$

$F_{PR}$ which is the operator which carries out filtering of a time region by cyclic convolution is, for example, as the following.
g(i) is an impulse response.

[Mathematical Expression 117]

$$X_k = F_{PR} X_{k-1} = \begin{bmatrix} g(0) & g(1) & g(2) & g(3) \\ g(1) & g(2) & g(3) & g(4) \\ g(2) & g(3) & g(4) & g(5) \\ \vdots & \vdots & \vdots & \vdots \\ g(n-1) & g(n) & g(0) & g(1) \\ g(n) & g(0) & g(1) & g(2) \end{bmatrix} \begin{bmatrix} x_{k-1}(0) \\ x_{k-1}(1) \\ x_{k-1}(2) \\ x_{k-1}(3) \end{bmatrix} \quad (117)$$

The operator $F_{PPN}$ has a role of a polyphase filter with respect to time-sequence data.

[Mathematical Expression 118]

$$X_k = \quad (118)$$

$$F_{PPN} X_{k-1} = \begin{bmatrix} pp_0(Z^M) & 0 & 0 & 0 \\ 0 & pp_0(Z^M) & 0 & 0 \\ 0 & 0 & pp_0(Z^M) & 0 \\ 0 & 0 & 0 & pp_0(Z^M) \end{bmatrix} \begin{bmatrix} x_{k-1}(0) \\ x_{k-1}(1) \\ x_{k-1}(2) \\ x_{k-1}(3) \end{bmatrix}$$

$pp_i(Z^M)$ is an operator including a delay operator and is formed in a following manner. The following expression shows a case of a polyphase configuration, wherein M=4 and K=4, and a filter length having an impulse coefficient g is KM=16. $z^{-M}$ is a delay operator with respect to $x_{k-1}$, and this represents that the data after M timing is utilized.

[Mathematical Expression 119]

$$pp_i(Z^M) = g(i) + g(i+M)z^{-M} + g(i+2M)z^{-2M} + g(i+3M)z^{-3M} \quad (119)$$

K in a case of K=4 has a following relation.

[Mathematical Expression 120]

$$pp_i(Z^M) = \sum_{q=1}^{K} g(i + (q-1)M) z^{-(q-1)M} \quad (120)$$

Herein, q=1 to K

The operator $F_{DET}$ can be expressed by, for example, a following expression.

[Mathematical Expression 121]

$$X_k = F_{DET} X_{K-1} = \begin{bmatrix} 1 & z^{-1} & z^{-2} & z^{-3} \end{bmatrix} \begin{bmatrix} x_{k-1}(0) \\ x_{k-1}(1) \\ x_{k-1}(2) \\ x_{k-1}(3) \end{bmatrix} \quad (121)$$

Herein, $z^{-1}$ is a delay operator. Data is arranged in time sequence by this delay unit.

The operator Fc is an operator for frequency amplitude phase correction by filter processing and is expressed by, for example, a following expression. fc is a complex number representing a reverse characteristic of the filter of each subcarrier.

[Mathematical Expression 122]

$$X_k = F_C X_{k-1} = \begin{bmatrix} fc_0 & 0 & 0 & 0 \\ 0 & fc_1 & 0 & 0 \\ 0 & 0 & fc_2 & 0 \\ 0 & 0 & 0 & fc_3 \end{bmatrix} \begin{bmatrix} x_{k-1}(0) \\ x_{k-1}(1) \\ x_{k-1}(2) \\ x_{k-1}(3) \end{bmatrix} \quad (122)$$

The operator Fβ is expressed by, for example, a following expression. This is used in a case in which an adjustment coefficient is subjected to multiplication for each subcarrier as preprocessing. β is a complex number.

[Mathematical Expression 123]

$$X_k = F_\beta X_{k-1} = \begin{bmatrix} \beta_0 & 0 & 0 & 0 \\ 0 & \beta_1 & 0 & 0 \\ 0 & 0 & \beta_2 & 0 \\ 0 & 0 & 0 & \beta_3 \end{bmatrix} \begin{bmatrix} x_{k-1}(0) \\ x_{k-1}(1) \\ x_{k-1}(2) \\ x_{k-1}(3) \end{bmatrix} \quad (123)$$

In the above described manner, the filtered multicarrier signals can be generated.

Examples of the operator which functions as the signal generation operator include the following.

$S_{CP}$: An operator which carries out addition of CP (Cyclic Prefix) for synchronization. This is carried out after filtering. The presence/absence of $S_{CP}$ can be selected depending on a signal scheme.

Swin: An operator which subjects data to Windowing processing.

When the CP number is 2, the operator $S_{CP}$ is expressed by, for example, a following expression.

[Mathematical Expression 124]

$$X_k = S_{CP} X_{k-1} = \begin{bmatrix} 0 & 0 & 1 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix} \begin{bmatrix} x_{k-1}(0) \\ x_{k-1}(1) \\ x_{k-1}(2) \\ x_{k-1}(3) \end{bmatrix} = \begin{bmatrix} x_{k-1}(2) \\ x_{k-1}(3) \\ x_{k-1}(0) \\ x_{k-1}(1) \\ x_{k-1}(2) \\ x_{k-1}(3) \end{bmatrix} \quad (124)$$

[Mathematical Expression 125]

$$X_k = S_{WIN} X_{k-1} = [win(0) \ win(1) \ win(2) \ win(3)] \begin{bmatrix} x_{k-1}(0) \\ x_{k-1}(1) \\ x_{k-1}(2) \\ x_{k-1}(3) \end{bmatrix} \quad (125)$$

Herein, win(i) is a coefficient of windowing in the time sequence region.

Examples of the operator which functions as the characteristic addition operator include the following.

$S_T$: An operator which adds distortion of a transmission path.

Herein, the operator $S_T$ corresponds to the propagation characteristics and the like of the test medium 83 of FIG. 1 of the first embodiment to the third embodiment.

$S_{CFO}$: An operator which carries out addition of CFO (Carrier Frequency Offset).

Herein, the operator $S_{CFO}$ corresponds to CFO adjustment, $\tau$ adjustment, $\tau_1$ adjustment, and $\tau_2$ adjustment of the first embodiment to the third embodiment.

$S_N$: An operator which carries out addition of noise.

The operator $S_T$ is expressed by, for example, a following expression. st is a complex number expressing transmission-path distortion. Note that $S_T$ is applicable to time sequences and frequency sequences. Note that, in the filter module 25 of the signal receiving device 82 of the first embodiment to the third embodiment, the operator $S_T$ and the processing of $F_U$, $F_P$, $F_{PR}$, $F_{PPN}$, $F_{DET}$, $F_C$, $F\beta$, and the like set in the input/output module 116 may be utilized.

[Mathematical Expression 126]

$$CX_k = S_T X_k = \begin{bmatrix} st_{00} & st_{01} & st_{02} & st_{03} \\ st_{10} & st_{11} & st_{12} & st_{13} \\ st_{20} & st_{21} & st_{22} & st_{23} \\ st_{30} & st_{31} & st_{32} & st_{33} \end{bmatrix} \quad (126)$$

The operator $S_{CFO}$ is expressed by, for example, a following expression. cfo is a complex number, which represents a frequency shift. Note that $S_{CFO}$ is applicable to time sequences and frequency sequences.

[Mathematical Expression 127]

$$CX_k = S_{CFO} X_k = \begin{bmatrix} cfo_0 & 0 & 0 & 0 \\ 0 & cfo_1 & 0 & 0 \\ 0 & 0 & cfo_2 & 0 \\ 0 & 0 & 0 & cfo_3 \end{bmatrix} \begin{bmatrix} x_k(0) \\ x_k(1) \\ x_k(2) \\ x_k(3) \end{bmatrix} \quad (127)$$

The operator $S_N$ is expressed by, for example, a following expression. This expects a model in which an independent noise sequence v provides amplitude phase characteristics to sn by each subcarrier and is superimposed thereon. Note that $S_N$ is applicable to time sequences and frequency sequences.

[Mathematical Expression 128]

$$DV = S_N V = \begin{bmatrix} sn_0 & 0 & 0 & 0 \\ 0 & sn_1 & 0 & 0 \\ 0 & 0 & sn_2 & 0 \\ 0 & 0 & 0 & sn_3 \end{bmatrix} \begin{bmatrix} v(0) \\ v(1) \\ v(2) \\ v(3) \end{bmatrix} \quad (128)$$

Note that, although it is not shown in the fourth embodiment, STO adjustment can be arbitrarily selected, which is the same as the first embodiment to the third embodiment.

The signal generating device 191 can flexibly change the signal type, the number of subcarriers, the modulation scheme, the filtering scheme, the presence/absence of synchronization signals, and the like, by combining the operators A, B, C, and D. Therefore, the signal generating device 191 can generate various multicarrier signals by a simple configuration.

The signal generating device of the fourth embodiment shown in FIG. 15 has a different effect that various multicarrier signals can be generated by the simple configuration.

Fifth Embodiment: Signal Generating Techniques

In a fifth embodiment, an example in which the signal generating device 191 of the fourth embodiment generates multicarrier signals will be described. A scenario forming module 111 sets the operators A and B and the order of operation. When UF-OFDM signals are to be generated as the multicarrier signals, the scenario forming module 111 sets $A_1=\{0\}$, $B_1=M_M$, $A_2=T_{iFFT}$, $B_2=\{0\}$, $A_3=F_P$, and $B_3=\{0\}$ as the operators A and B. In the present embodiment, a case in which the modulation scheme of the operator $M_M$ is a 16QAM modulation scheme will be described.

k=0

The scenario forming module 111 inputs an input vector U to an executing module 112. Since the modulation scheme of the present embodiment is the 16QAM modulation scheme, the scenario forming module 111 inputs the input vector U shown by Expression (104) to the executing module 112.

k=1

The scenario forming module 111 specifies $A_1=\{0\}$ and $B_1=M_M$. Since the modulation scheme of the present embodiment is the 16QAM modulation scheme, the scenario forming module 111 inputs the operator $M_M$ with which symbol points are at 16 locations to the executing module 112. The executing module 112 functions as an executing module and calculates Expression (102) by using these operators, thereby deriving a state vector $X_1$. Note that the processing herein corresponds to the processing of the mapping module 11 and the frame-format generating module 12 of the signal transmitting device 81 of the first embodiment to the third embodiment.

[Mathematical Expression 201]

$$X_1 = M_M U \quad (201)$$

k=2

The scenario forming module 111 specifies $A_2=T_{iFFT}$ and $B_2=\{0\}$. The executing module 112 functions as an executing module and calculates Expression (202) by using these operators, thereby deriving a state vector $X_2$. Note that the processing herein corresponds to the processing of the iFFT module 13 of the first embodiment to the third embodiment.

[Mathematical Expression 202]

$$X_2 = T_{iFFT}*X_1 = T_{iFFT}*(M_M U) \quad (202)$$

Since the operator $T_{iFFT}$ is applied, the state vector $X_2$ becomes a vector signal sequence which has become multicarrier. Herein, a constant coefficient may be subjected to multiplication in the operation of Fourier inverse transform.

k=3

The scenario forming module 111 specifies $A_3=F_P$ and $B_3=\{0\}$. The executing module 112 functions as an executing module and calculates Expression (102) by using these operators, thereby deriving a state vector $X_3$. Note that the processing herein corresponds to the processing of the filter module 14 of the signal transmitting device 81 of the first embodiment to the third embodiment.

[Mathematical Expression 203]

$$X_3 = F_P*X_2 = F_P*T_{iFFT}*(M_M U) \quad (203)$$

Since the operator $F_P$ is applied, the state vector $X_3$ becomes a vector signal sequence which has become filtered multicarrier. At this time point, one symbol of a UF-OFDM signal is completed.

k=4

The scenario forming module 111 specifies $C=\{E\}$ and $D=\{0\}$. The executing module 112 functions as an executing module and calculates Expression (103) by using these operators, thereby deriving an output vector Y.

[Mathematical Expression 204]

$$Y = EX_3 \quad (204)$$

The amplitude phase distortion of the filter according to the operator $F_P$ is corrected in some cases. In this case, an operator $F_C$ is carried out as an operator A before k=2. The operator $F_C$ is expressed by the operator $T_{iFFT}$. In this case, state vectors $X_2$ to $X_4$ become the following. Note that the processing herein corresponds to the processing of a filter correcting module of the first embodiment to the third embodiment.

$$X_2 = F_C*X_1 = T_{iFFT}*(M_M U)$$

$$X_3 = T_{iFFT}*X_2 = T_{iFFT}*F_C*(M_M U)$$

$$X_4 = F_P*X_3 = F_P*T_{iFFT}*F_C*(M_M U)$$

$$Y = EX_4 \quad (205)$$

Herein, regarding correction of frequency characteristics, once $F_P*T_{iFFT}*E$ (E is an identity matrix) is created, and a frequency distortion value of each subcarrier can be calculated by $T_{FFT}(F_P*T_{iFFT}*E)$. When an element of inverse matrix of this matrix as correction value is respectively used to an element of $F_U$ shown in Expression (113), correction processing can be calculated in a closed manner within this system. A correction value obtained from a numerical value operated by utilizing an observation equation described in the following seventh embodiment in a transmission scenario may be fed back to the parameter of $F_U$.

For example, output is obtained by $Y=E*F_P*E$, a correction value is obtained based on a complex number obtained for each subcarrier obtained by $T_{FFT}(Y)(T_{FFT}Y)$ and is assigned to the element of each subcarrier of $F_U$ to form $F_U$.

In this manner, UF-OFDM signals and CP-OFDM signals can be generated by the combinations of operators in accordance with the order set by the scenario forming module 111. For example, the signal generation of the schemes disclosed by Non-Patent Documents such as CP-OFDM, GFDM (Generalized Frequency Division Multiplexing), and FBMC (Filter Bank MultiCarrier) can be carried out by using following operators.

In a case of CP-OFDM, $B_1=M_M$, $A_2=T_{iFFT}$, $A_3=S_{cp}$, $A_1=B_2=B_3=\{0\}$ are used.

In a case of Windowing-OFDM, $B_1=M_M$, $A_2=T_{iFFT}$, $A_3=S_{CP}$, $A_4=S_{WIN}$, $A_1=B_2=B_3=\{0\}$ are used.

In a case of GFDM, $B_1=M_M$, $A_2=M_T$, $A_3=F_{PR}$, $A_4=T_{iDFT}$, $A_5=S_{CP}$, $A_1=B_2=B_3=\{0\}$ are used.

In a case of FBMC, wherein filtering of frequency regions is to be carried out, $B_1=M_M$, $A_2=F_U$, $A_3=T_{iFFT}$, $A_1=B_2=B_3=\{0\}$ are used.

In a case of FBMC which carries out filtering of time regions, $B_1=M_M$, $A_2=F_P$, $A_3=T_{iFFT}$, $A_4=F_{PPM}$, $A_5=F_{DET}$, $A_1=B_2=B_3=\{0\}$ are used.

As described above, the signal generating device 91 according to the embodiment can build multicarrier signals of the schemes by using combinations of the operators. Note that the information operated and generated in this manner may be stored in the filter module 25 of the signal receiving device 82 of the first embodiment to the third embodiment.

Sixth Embodiment: Signal Generating Techniques

In the sixth embodiment, an example of generating characteristics-varied multicarrier signals by the signal generating device 191 of the fourth embodiment or the fifth embodiment will be described. When the characteristics-varied multicarrier signals are to be generated, the scenario forming module 111 further sets operators C and D and the order of operation in addition to the operators A and B. The scenario forming module 111 sets, for example, $C=S_T$ and $D=S_N$.

If the scenario forming module 111 sets $C=S_T$ and $D=S_N$, in k=4 described in the first embodiment, the scenario forming module 111 inputs the operators $C=S_T$ and $D=S_N$ and a disturbance vector V to the executing module 112. An output vector Y is derived by calculating Expression (301) by using these operators. Note that this processing corresponds to adding the characteristics of the test medium 83 of the first embodiment to the third embodiment.

$$Y = S_T X_3 + S_N V \quad (301)$$

In a case in which addition of CFO is to be further carried out in addition to the distortion of the transmission path, in k=4 described in the first embodiment, the scenario forming module 111 inputs the operator $C_1=S_{CFO}$, $C_2=S_T$, $D=A_N$, and the disturbance vector V to the executing module 112. In this case, Expression (301) becomes the following.

[Mathematical Expression 302]

$$Y = S_T S_{CFO} X_3 + A_N V \quad (302)$$

When the operators C and D and the disturbance vector V are set in this manner, the multicarrier signals to which the transmission-path characteristics and disturbances are added can be generated.

Note that the information operated and generated in this manner may be stored in the filter module 25 of the signal receiving device 82 of the first embodiment to the third embodiment.

Seventh Embodiment: Signal Generating Techniques

In the seventh embodiment, the CPU provided in the signal generating device 191 of the fourth embodiment, the fifth embodiment, or the sixth embodiment further functions as an evaluating module 115. The evaluating module 115 evaluates multicarrier signals. When the evaluation of the multicarrier signal is to be carried out, the scenario forming module 111 sets an operator defined as G, which is a signal analysis operator used in evaluation of the multicarrier signal, and the order of operation.

k=0

The scenario forming module 111 inputs the multicarrier signal to the evaluating module 115 as a reception vector R. At this point, the scenario forming module 111 sets an operator $T_{FFT}$ in order to convert the multicarrier signal to a sequence signal of a frequency region. The evaluating module 115 calculates $T_{FFT}*R$. Note that this processing corresponds to the processing of the FFT module 26 of the signal receiving device 82 of the first embodiment to the third embodiment.

k=1

The scenario forming module 111 specifies an operator G for the evaluating module 115. The evaluating module 115 calculates $G^*(T_{FFT}*R)$.

Examples of the operator G include the following.

$G_{CCDF}$: An operator which carries out CCDF (Complementary Cumulative Distribution Function) processing. By virtue of this, an amplitude probability distribution of received signals can be formed. CCDF is equivalent to PAPR (Peak to Average Power Ratio) evaluation. This is the processing carried out between the FFT module 26 and the mapping module 27 of the signal receiving device 82 of the first embodiment to the third embodiment.

$G_{CS}$: An operator which carries out constellation processing. The constellation processing includes an average, dispersion, and EVM (Error Vector Magnitude) of each subcarrier. This can be applied to each constellation. This is the processing inserted between the mapping module 27 and the frequency-phase-characteristic operating module 28 of the first embodiment to the third embodiment.

If the amplitude probability distribution (CDF: Cumulative Distribution Function) is $f_{CDF}$, CCDF can be obtained by $f_{CCDF}=1-f_{CDF}$. If a vector display of $f_{CCDF}$ of each subcarrier is $F_{CDF}$, the operator $G_{CCDF}$ is expressed by, for example, Expression (401). j of a $f_{CCDF}$ operator represents an amplitude probability distribution up to a level j. At which position a reception level is at among level intervals determined in advance is detected, and predetermined COUNT of the detected level is increased by +1, thereby obtaining a frequency; and an amplitude distribution is obtained by accumulating it from those at higher levels.

[Mathematical Expression 401]

$$G_{CCDF} R = (1 - F_{CDF})R \quad (401)$$

$$= \begin{bmatrix} f_{CCDF}(0,j) & 0 & 0 & 0 \\ 0 & f_{CCDF}(1,j) & 0 & 0 \\ 0 & 0 & f_{CCDF}(2,j) & 0 \\ 0 & 0 & 0 & f_{CCDF}(3,j) \end{bmatrix} \begin{bmatrix} r_k(0) \\ r_k(1) \\ r_k(2) \\ r_k(3) \end{bmatrix}$$

$f_{CCDF}$ is according to the following. z is a time-advance operator, k is the number of pieces of data, j is an index of amplitude level, and Lj is the amplitude level.

At Initialization, count(j)=0(j=0,1,2 . . . ,J−1)

$f_{CCDF}(m,j)=1/J\Sigma_{i=0}^{j}$ count($L_i$), provided that for any k,j(0≤k≤K−1,0≤j≤J−1)

0 dB≤$L_j$($L_j-L_{j+1}$=0.01)≤100 dB

{count($L_j$)=count($L_j$)+1|satisfied by $L_{j+1}$≤10 log$_{10}$|z−$k_{r_k}(m)$|<$L_j$}     [Mathematical Expression 402]

The operator $G_{CS}$ is expressed by, for example, a following expression. A suffix k is on the assumption that reception vectors come in time sequence.

[Mathematical Expression 403]

$$G_{CS} R = \begin{bmatrix} cs_0 & 0 & 0 & 0 \\ 0 & cs_1 & 0 & 0 \\ 0 & 0 & cs_2 & 0 \\ 0 & 0 & 0 & cs_3 \end{bmatrix} \begin{bmatrix} r_k(0) \\ r_k(1) \\ r_k(2) \\ r_k(3) \end{bmatrix} \quad (403)$$

In constellation processing, when the average of each subcarrier is to be obtained, for example, following operation is carried out.

[Mathematical Expression 404]

$$G_{CS} R = \begin{bmatrix} 1/K \sum_{k=0}^{K-1} z^{-k} & 0 & 0 & 0 \\ 0 & 1/K \sum_{k=0}^{K-1} z^{-k} & 0 & 0 \\ 0 & 0 & 1/K \sum_{k=0}^{K-1} z^{-k} & 0 \\ 0 & 0 & 0 & 1/K \sum_{k=0}^{K-1} z^{-k} \end{bmatrix} \begin{bmatrix} r_k(0) \\ r_k(1) \\ r_k(2) \\ r_k(3) \end{bmatrix} \quad (404)$$

In constellation processing, if EVM of each subcarrier is to be obtained, for example, following operation is carried out.

[Mathematical Expression 405]

$$G_{CS}R = \begin{bmatrix} Evm(0) & 0 & 0 & 0 \\ 0 & Evm(1) & 0 & 0 \\ 0 & 0 & Evm(2) & 0 \\ 0 & 0 & 0 & Evm(3) \end{bmatrix} \begin{bmatrix} r_k(0) \\ r_k(1) \\ r_k(2) \\ r_k(3) \end{bmatrix} \quad (405)$$

$$Evm(j) = 100\sqrt{\frac{1/K\sum_{k=0}^{K-1}((I_k - z^{-k}\text{real}(r_k(j))^2 + (Q_k - z^{-k}\text{imag}(r_k(j))^2)}{1/K\sum_{k=0}^{K-1}((I_k)^2 + (Q_k)^2)}}$$

Herein, $I_k$ and $Q_k$ represent reference values determined in advance.

A desired parameter can be acquired by changing an internal parameter of the operator of the state vector X based on this evaluation value. Moreover, feedback is carried out according to the result of the evaluation, and the operator function of the system can be updated by including the feedback value thereof and the internal parameter of the corresponding operator in advance. As a result, update of the contents applied to an actual system can be carried out.

Moreover, if $Y=L(M_M U)$, L is obtained. For example, if L such as $F_{PR}*T_{iDFT}*F_U$ has a regular property, L can calculate an inverse matrix and obtain $M_M U$ according to $M_M U=L^{-1}Y$. If it is not regular, a pseudo inverse matrix can be calculated and obtained.

The above description is operation of each single symbol, but is applicable also to a plurality of symbols. This case can be realized by increasing a state variable matrix in a column direction.

Eighth Embodiment: Signal Generating Techniques

In the eighth embodiment, actions of the scenario forming module 111 of the fourth embodiment, the fifth embodiment, the sixth embodiment, or the seventh embodiment will be described. A scenario includes an executable arbitrary task of a signal generating device 191. Tasks are, for example, signal generation, signal analysis, feedback, and communication IF. The signal types processed by the tasks are, for example, OFDM, CP-OFDM, UF-OFDM, FBMC, GFDM, Filtered OFDM, and Windowing-OFDM.

The scenario forming module 111 references a database (not shown) storing the information required for scenarios and associate these information by a sequencer. The scenario forming module 111 converts the associated information to the formats which are executable in an executing module 112. Commands obtained as a result are executed by the sequencer.

The database referenced by the scenario forming module 111 stores the signal types of multicarrier signals, code sequences of input signals, synchronization codes (pilot patterns, preambles), the number of subcarriers, the number of symbols, modulation schemes, TTI (Time Transmission Interval), and the like. The database may have a hierarchical configuration in the order of steps, the signal types of the multicarrier signals, attributes of the multicarrier signals, code sequences, and the like.

The scenario forming module 111 may control the executing module 112 in accordance with commands from a communication IF 117. For example, the scenario forming module 111 additionally updates the information stored in the database (not shown) in accordance with the commands input from the communication IF 117. In this manner, the present embodiment is preferred to be configured so that remote operations from outside can be carried out by a specified command language. The remote operations from outside are, for example, scenario activation, scenario update, and parameter update (code sequence and the like).

The scenario forming module 111 carries out a setting step, a designing step, and an executing step in order to execute a signal generation task. In the setting step of the signal generation task, the signal generating device 191 acquires the information required for generating a multicarrier signal. The information required for generating the multicarrier signal is, for example, a signal type, a code sequence, a synchronization code, the number of subcarriers, the number of symbols, a modulation scheme to carry out modulation, TTI (Time Transmission Interval), an applied filter type, the presence/absence of filter correction, the presence/absence of CP, and the number of CP. A method of acquiring the information is arbitrary, the information may be acquired from an input/output module of the signal generating device 191, may be acquired from the communication IF 117, or may be read from the database (not shown).

In the designing step of the signal generation task, the scenario forming module 111 sets the operators used in operation of a state vector X and the order thereof in accordance with the input in the setting step. In this process, the scenario forming module 111 also sets parameters to be used in the operation of the operator(s).

In the executing step of the signal generation task, actions are carried out in a time-varying system by using an execution permitting flag. As a result, a multicarrier signal of a desired signal type, a desired code sequence, a desired synchronization code, the desired number of subcarriers, the desired number of symbols, a desired modulation scheme, and desired TTI can be generated.

The scenario forming module 111 carries out a setting step, a designing step, and an executing step in order to execute a signal analysis task.

In the setting step of the signal analysis task, analysis contents are set. The analysis contents are, for example, CCDF processing or constellation processing. In this process, the scenario forming module 111 reads operators and parameters, which are used until the output vector Y is derived, from a memory 113 as the operators and parameters for receiving the multicarrier signal.

In the setting step of the signal analysis task, in accordance with the input in the setting step, the operator(s) and the parameters thereof are set in the evaluating module 115. For example, if constellation processing is set in the setting step, the scenario forming module 111 sets an operator $G_{CS}$.

If the received signal is the multicarrier signal generated by the signal generating device 191, the signal generating device 191 may read the operators and parameters, which have been used in generation of the multicarrier signal, from the memory 113. For example, if an operator $T_{iFFT}$ is used until the output vector Y is derived, the scenario forming module 111 sets an operator $T_{FFT}$.

In an executing step of the signal analysis task, the evaluating module 115 acts in the time-varying system by using the execution-permitting flag. When feedback is to be carried out, the signal generation task is executed again. In this process, the scenario forming module 111 updates the parameters of the scenario.

As described above, the signal generating device 191 is capable of forming desired signals by repeating simple matrix structures. Furthermore, the signal generating device 191 is capable of evaluating signals and evaluating various parameters only in one device by carrying out feedback of evaluation results. Furthermore, the signal generating device 191 is capable of flexibly supporting orders from remote locations.

The devices provided in the systems according to the first embodiment to the eighth embodiment may be realized by functioning a computer as the configurations provided in the respective devices. In this case, the configurations are realized by executing a computer program stored in a storage module (not shown) by a central processing unit (CPU) in the devices. The computer program may be recorded in a computer-readable recording medium.

The embodiments are capable of providing:
tests of the signal transmitting device 81 and/or the signal receiving device 82,
tests of propagation characteristics and the like of the test medium 83, and
a means for avoiding a desynchronization phenomenon in a situation in which transmission/reception timing and/or frequencies in the above described tests do not match between transmission and reception with respect to transmission/reception test environments using multicarrier signals used in wireless communication fields such as local area network (LAN) and long term evolution (LTE).

The combinations of STO and CFO described in the above described embodiments are arbitrary. For example, STO described in the third embodiment and CFO described in the first or second embodiment may be combined, STO described in the first embodiment and CFO described in the second embodiment may be combined, or CFO described in the first embodiment and STO described in the second embodiment may be combined.

Ninth Embodiment: Transmitting/Receiving System

A transmitting/receiving system which transmits/receives multicarrier signals (including filtered multicarrier signals) can be formed by combining a signal receiving device to which the synchronization processing techniques described in the above described first embodiment to the third embodiment are applied and a signal transmitting device to which the signal generating techniques described in the fourth to eighth embodiments are applied. Therefore, the signal receiving device to which the synchronization processing techniques are applied and the signal transmitting device to which the signal generating techniques are applied are connected in terms of designs, actions, and effects about transmitting/receiving multicarrier signals (including filtered multicarrier signals).

The various modules of the systems described herein can be implemented as software applications, hardware and/or software modules, or components on one or more computers, such as servers. While the various modules are illustrated separately, they may share some or all of the same underlying logic or code.

Various inventions can be achieved by any suitable combination of a plurality of structural elements disclosed in the embodiments. For example, the some structural elements may be deleted from the whole structural elements indicated in the above-described embodiments. Furthermore, some structural elements of one embodiment may be combined with other structural elements of another embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method by which a signal generating device generates a multicarrier signal, comprising:

acquiring, via the device, a signal type of the multicarrier signal and a number of subcarriers, and setting a signal generation operator and an order in which the signal generation operator is caused to act for generating the multicarrier signal of the signal type; and acquiring, via the device, a number of input signals corresponding to the number of the subcarriers, and causing the signal generation operator to act on the input signal in accordance with the order in which the signal generation operator is caused to act, thereby generating the multicarrier signal from the input signal, wherein the signal generation operator is an operator $A_k$ or $B_k$ used in a state variable which is one of a time sequence, a frequency sequence and a code sequence, the state variable being expressed by a following state-space expressing expression at each generation process specified by a suffix k indicating the order:

$$X_k = A_k X_{k-1} + B_k U$$

wherein k is equal to 1, ..., N (N being a positive integer), U is an input vector expressing the input signal of each subcarrier by a vector, and $X_k$ is a state vector expressing a state variable $x_k$, and a scenario forming module sets the signal generation operator and an order of the operation, wherein $B_{p1}$ is conversion operator for mapping of U in a generation process of k=p1, $A_{p2}$ is an operator of Fourier inverse transform in a generation process of k=p2, in case of presence of CP for synchronization, a generation process of k=p3 is added, and a signal generation operator $A_{p3}$ in the generation process of k=p3 is an operator for adding CP for synchronization, where 1≤p1<p2<p3<N, when filtering processing is performed, a generation process of k=p4 is added, and a signal generation operator $A_{p4}$ in the generation process of k=p4 is an operator for adding filtering processing, where p4<p2, p4<p3 or p2<p4, when Windowing processing is performed, a generation process of k=p5 is added, and a signal generation operator $A_{p5}$ in the generation process of k=p5 is an operator for adding Windowing processing, where p4<p5<N, and $A_{p1}=B_{p2}=B_{p3}=B_{p4}=B_{p5}=0$, and the scenario forming module sets the signal generation operator and the order of the operation by combining the operators based on presence or absence of the CP for synchronization, presence or absence of the filtering processing or presence or absence of the Windowing processing.

2. A computer-readable device recording a program executed by a signal generating device, the program comprising:

acquiring a signal type of a multicarrier signal and a number of subcarriers and setting a signal generation operator and an order in which the signal generation operator is caused to act for generating the multicarrier signal of the signal type; and acquiring a number of input signals, corresponding to the number of the subcarriers and causing the signal generation operator to act on the input signal in accordance with the order in which the signal generation operator is caused to act, thereby generating the multicarrier signal from the input signal, wherein the signal generation operator is an operator $A_k$ or $B_k$ used in a state variable which is one of a time sequence, a frequency sequence and a code sequence, the state variable being expressed by a following state-space expressing expression at each generation process specified by a suffix k indicating the order:

$$X_k = A_k X_{k-1} + B_k U$$

wherein k is equal to 1, . . . , N (N being a positive integer), U is an input vector expressing the input signal of each subcarrier by a vector, and $X_k$ is a state vector expressing a state variable $x_k$, and a scenario forming module sets the signal generation operator and an order of the operation, wherein $B_{p1}$ is conversion operator for mapping of U in a generation process of k=p1, $A_{p2}$ is an operator of Fourier inverse transform in a generation process of k=p2, in case of presence of CP for synchronization, a generation process of k=p3 is added, and a signal generation operator $A_{p2}$ in the generation process of k=p3 is an operator for adding CP for synchronization, where 1≤p1<p2<p3<N, when filtering processing is performed, a generation process of k=p4 is added, and a signal generation operator $A_{p4}$ in the generation process of k=p4 is an operator for adding filtering processing, where p4<p2, p4<p3 or p2<p4, when Windowing processing is performed, a generation process of k=p5 is added, and a signal generation operator $A_{p5}$ in the generation process of k=p5 is an operator for adding Windowing processing, where p4<p5<N, and $A_{p1}=B_{p2}=B_{p3}=B_{p4}=B_{p5}=0$, and the scenario forming module sets the signal generation operator and the order of the operation by combining the operators based on presence or absence of the CP for synchronization, presence or absence of the filtering processing or presence or absence of the Windowing processing.

3. A synchronous circuit comprising:

a computer, the computer executing:

detecting a received signal including a first reference signal and a second reference signal;

storing information of the first reference signal;

carrying out correlation operation of the first reference signal included in the received signal and information of the first reference signal output from the storing;

carrying out timing synchronization so that a result of the correlation operation carried out by the correlation operation becomes a predetermined value, and carrying out phase synchronization of a subcarrier by adjusting a component varied depending on a phase of a subcarrier frequency using a phase modulation signal included in the second reference signal;

wherein the received signal is a filtered multicarrier signal, the computer further executes carrying out first filtering between the storing and the correlation operation;

the first filtering comprises filtering the information of the first reference signal output in the storing by a filtered multicarrier scheme corresponding to the filtered multicarrier signal and outputting the information for the correlation operation, the first reference signal and the second reference signal are input in the detecting after second filtering in transmitting through a test medium;

information reflecting a filter characteristic of the second filtering and a propagation characteristic of the test medium is stored in the first filtering; and the first filtering comprises reproducing the first reference signal and the second reference signal passed through the test medium after the second filtering by operation processing and outputting the reproduced first reference signal and the reproduced second reference signal for the correlation operation.

4. A synchronous circuit comprising:

a computer, the computer executing:

detecting a received signal including a first reference signal and a second reference signal;

storing information of the first reference signal;

carrying out correlation operation of the first reference signal included in the received signal and information of the first reference signal output from the storing;

carrying out timing synchronization so that a result of the correlation operation carried out by the correlation operation becomes a predetermined value, and carrying out phase synchronization of a subcarrier by adjusting a component varied depending on a phase of a subcarrier frequency using a phase modulation signal included in the second reference signal;

wherein the received signal is a filtered multicarrier signal, the detecting a received-signal includes receiving the signal;

the timing-synchronization further includes adjusting a symbol timing offset (STO) and first filtering; and the phase-synchronization includes executing a fast Fourier transform (FFT), executing mapping, operating frequency-phase-characteristics and resampling.

5. A method of using a synchronous circuit, comprising:

detecting, via the circuit, a received signal including a first reference signal and a second reference signal;

carrying out, via the circuit, a timing-synchronization including a storage processing of storing information of the first reference signal and a correlation processing of carrying out correlation operation of the first reference signal included in the received signal and the information of the first reference signal output through the storage processing, so that a result of the correlation processing becomes a predetermined value; and carrying out, via the circuit, phase synchronization of a subcarrier by adjusting a component varied depending on a phase of a subcarrier frequency using a phase modulation signal included in the second reference signal, wherein the received signal is a filtered multicarrier signal, the timing synchronization includes executing first filtering processing between the storage processing and the correlation operating, the first filter processing includes the correlation operating by filtering and outputting the information of the first reference signal output in the storage processing by a filtered multicarrier scheme, the first reference signal and the second reference signal detected in the detecting are signals already subjected to a second filter processing included in the transmitting and passed through a test medium, and the first filter processing reproduces, by operation processing, the first reference signal and the second reference signal passed through the second filter processing and the test medium, by using information reflecting a filter characteristic of the second filter processing and a propagation characteristic of the test medium, and outputs the reproduced first reference signal and the reproduced second reference signal, thereby carrying out the correlation operation.

6. A device generating a multicarrier signal, comprising:

a computer, the computer executing:

acquiring a signal type of the multicarrier signal and a number of subcarriers, and setting a signal generation operator and an order in which the signal generation operator is caused to act for generating the multicarrier signal of the signal type; and acquiring a number of input signals, corresponding to the number of the subcarriers, and causing the signal generation operator to act on the input signal in accordance with the order in which the signal generation operator is caused to act, thereby generating the multicarrier signal from the input signal, wherein the signal generation operator is an operator $A_k$ or $B_k$ used in a state variable which is one of a time sequence, a frequency sequence and a code sequence, the state variable being expressed by a following state-space expressing expression at each generation process specified by a suffix k indicating the order:

$$X_k = A_k X_{k-1} + B_k U$$

wherein k is equal to 1, . . . , N (N being a positive integer), U is an input vector expressing the input signal of each subcarrier by a vector, and $X_k$ is a state vector expressing a state variable $x_k$, and a scenario forming module sets the signal generation operator and an order of the operation, wherein $B_{p1}$ is conversion operator for mapping of U in a generation process of k=p1, $A_{p2}$ is an operator of Fourier inverse transform in a generation process of k=p2, in case of presence of CP for synchronization, a generation process of k=p3 is added, and a signal generation operator $A_{p3}$ in the generation process of k=p3 is an operator for adding CP for synchronization, where 1≤p1<p2<p3<N, when filtering processing is performed, a generation process of k=p4 is added, where 1≤p1<p2<p3<N, when filtering processing is performed, a generation process of k=p4 is added, and a signal generation operator $A_{p4}$ in the generation process of k=p4 is an operator for adding filtering processing, where p4<p2, p4<p3 or p2<p4, when Windowing processing is performed, a generation process of k=p5 is added, and a signal generation operator $A_{p5}$ in the generation process of k=p5 is an operator for adding Windowing processing, where p4<p5<N, and $A_{p1} = B_{p2} = B_{p3} = B_{p4} = B_{p5} = 0$, and the scenario forming module sets the signal generation operator and the order of the operation by combining the operators based on presence or absence of the CP for synchronization, presence or absence of the filtering processing or presence or absence of the Windowing processing.

7. The device generating the multicarrier signal according to claim 6, comprising:

wherein the acquiring includes acquiring a characteristic to be added to the multicarrier signal;

the setting includes setting a characteristic addition operator and an order in which the characteristic addition operator is caused to act required to add the characteristic; and the generating includes adding the characteristic to the generated multicarrier signal by causing the characteristic addition operator to act on the input signal in accordance with the order in which the characteristic addition operator is caused to act.

8. The device generating the desired multicarrier signal according to claim 7, wherein the characteristic addition operator is an operator $C_k$ or $D_k$ used in a state variable which is a time sequence or a frequency sequence and which is expressed by a following state-space expressing expression at each generation process specified by a suffix k indicating the order:

$$Y = C_k X_k + D_k V$$

wherein k is equal to 1, . . . , N (N being a positive integer), V is a disturbance vector expressing a disturbance of each subcarrier by a vector, and $X_k$ is a state vector expressing a state variable $x_k$, the operation $C_k$ includes at least one of an operator which adds distortion of a transmission path and an operator which adds a frequency shift, and the operator $D_k$ includes an operator which provides amplitude phase characteristics for each subcarrier.

* * * * *

UNITED STATES PATENT AND TRADEMARK OFFICE
CERTIFICATE OF CORRECTION

PATENT NO. : 10,798,668 B2
APPLICATION NO. : 15/471122
DATED : October 6, 2020
INVENTOR(S) : Sunao Ronte Page 1 of 1

It is certified that error appears in the above-identified patent and that said Letters Patent is hereby corrected as shown below:

In the Claims

In Column 34, Line 37, delete "desired".

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*